United States Patent
Yang et al.

(10) Patent No.: US 8,112,289 B2
(45) Date of Patent: Feb. 7, 2012

(54) METHOD FOR ELECTRONIC EXAMINATION OF MEDICAL FEES

(75) Inventors: Young Kwon Yang, Seoul (KR); Jin Seong Kim, Gyeonggi-do (KR); Ji Seung Lee, Gyeonggi-do (KR); Keun Ho Bang, Seoul (KR); Byoung Min Lee, Seoul (KR)

(73) Assignee: Health Insurance Review & Assessment Service (KR)

( * ) Notice: Subject to any disclaimer, the term of this patent is extended or adjusted under 35 U.S.C. 154(b) by 1314 days.

(21) Appl. No.: 11/513,813

(22) Filed: Aug. 31, 2006

(65) Prior Publication Data

US 2007/0208594 A1    Sep. 6, 2007

(30) Foreign Application Priority Data

Mar. 3, 2006  (KR) .................. 10-2006-0020272

(51) Int. Cl.
*G06Q 10/00* (2006.01)
(52) U.S. Cl. .......................................................... 705/2
(58) Field of Classification Search ............... 705/35–45
See application file for complete search history.

(56) References Cited

U.S. PATENT DOCUMENTS

| | | | | |
|---|---|---|---|---|
| 5,794,208 | A * | 8/1998 | Goltra ................................ | 705/3 |
| 6,324,516 | B1 * | 11/2001 | Shults et al. ...................... | 705/2 |
| 2005/0065819 | A1 * | 3/2005 | Schultz ............................. | 705/2 |
| 2005/0192839 | A1 * | 9/2005 | St. Jacques et al. ............... | 705/2 |
| 2005/0273360 | A1 * | 12/2005 | Drucker et al. ................... | 705/2 |

FOREIGN PATENT DOCUMENTS

| | | |
|---|---|---|
| JP | 2000293573 | 10/2000 |
| JP | 2002109069 | 4/2002 |
| JP | 2002183381 | 6/2002 |
| JP | 2004164249 | 6/2004 |
| JP | 2005050245 | 2/2005 |

* cited by examiner

*Primary Examiner* — Rajesh Khattar
(74) *Attorney, Agent, or Firm* — St. Onge Steward Johnston & Reens LLC

(57) ABSTRACT

Disclosed is a method for electronic examination of medical fees, and more particularly to a method for electronic examination of medical fees using a system for electronic examination of medical fees. The system includes a transmit/receive server, a bill examination server, a management terminal and examiner terminals, and communicates with each medical institution server and a national health insurance corporation server. The bill examination server checks any error in medical bills and specifications received from each medical institution server through description inspection, automatic inspection, specialist inspection and computational examination. The bill examination server returns, corrects or adjusts any erroneous bill or specification, or inserts a message into the erroneous bill or specification. The management terminal distributes medical bills and specifications on which computational examination has been completed to the examiner terminals. Each examiner terminal produces a statement of examination adjustment according to the examination results inputted by an examiner during on-screen examination and sends the statement to the bill examination server. Then the bill examination server generates an examination decision file based on the examination results and sends the file to the corresponding medical institution server and simultaneously to the national health insurance corporation server.

10 Claims, 20 Drawing Sheets

Division distribution registration  <W_JFD211>

(401) 4630730
(403) 32200161
(404) 48
(402) 2006.11.21
(405) JUNGSUN MEDICAL CENTER
(406) 48
(407)
(408)
(409) Storing
(410) Close

| (411) | (412) | (413) | (414) | (415) | (416) |
|---|---|---|---|---|---|
| L01 01 | | SHIN, Sock Hee | | | |
| | | YEON, Jung Hee | | | |
| | | YOON, Kyung Sook | | | |
| | | LEE, Soo Ni | | | |
| | | LEE, Hwa Jung | | | |
| | | JUNG, Hee Sook | | | |

| (417) | (418) | (419) | (420) | (421) | (422) | (423) | (424) | (425) | (426) | (427) |
|---|---|---|---|---|---|---|---|---|---|---|
| 0000100 | LEE | 361024 | 8,440 | (439) | AQ1 | | | | J60 | Coal wor |
| 0000200 | SHIN | 361105 | 8,420 | (439) | AQ1 | | | | E115 | Peripher |
| 0000300 | KIM | 520513 | 8,420 | (439) | AQ1 | | | | K702 | Alcoholi |
| 0000400 | AHN | 270805 | 57,680 | (439) | AQ1 | | | | M404 | The othe |
| 0000500 | HEO | 370614 | 9,050 | (439) | AQ1 | | | | I10 | Hyperten |
| 0000600 | CHOI | 560623 | 8,420 | (439) | AQ1 | | | | D022 | Hyperten |
| 0000700 | PARK | 330220 | 8,420 | (439) | AQ1 | | | | J00 | Coryza a |
| 0000800 | CHO | 351107 | 8,450 | (439) | AQ1 | | | | I10 | Hyperten |
| 0000900 | SONG | 150430 | 85,850 | (439) | AQ1 | | | | N390 | Region |
| 0001000 | LEE | 140213 | 8,730 | (439) | AQ1 | | | | A165 | Bacterio |
| 0001100 | PARK | 361214 | 9,050 | (439) | AQ1 | | | | K219 | Esophagi |
| 0001200 | KWON | 551113 | 9,670 | (439) | AQ1 | | | | J00 | Coryza a |
| 0001300 | LEE | 240807 | 9,050 | (439) | AQ1 | | | | M199 | Unidenti |
| 0001400 | KIM | 311118 | 34,490 | (439) | AQ1 | | | | J40 | Acute |
| 0001500 | CHOI | 260416 | 8,630 | (439) | AQ1 | | | | M199 | Esophagi |
| 0001600 | HAN | 300427 | 11,610 | (439) | AQ1 | | | | I1110 | (Congest |
| 0001700 | PARK | 490518 | 8,630 | (439) | AQ1 | | | | K210 | Esophagi |
| 0001800 | CHOI | 500226 | 8,730 | (439) | AQ1 | | | | D509 | Unidenti |
| 0001900 | HAN | 250708 | 46,270 | (439) | AQ1 | | | | I10 | Hyperten |
| 0002000 | PARK | 170908 | 49,060 | (439) | AQ1 | | | | N201 | Ureter |
| 0002100 | LEE | 181104 | 76,010 | (439) | AQ1 | | | | N390 | Region |
| 0002200 | WUI | 220818 | 16,840 | (439) | AQ1 | | | | I1110 | (Congest |
| 0002300 | OH | 460813 | 37,610 | (439) | AQ1 | | | | I10 | Hyperten |
| 0002400 | LEE | 320313 | 39,450 | (439) | AQ1 | | | | I10 | Hyperten |
| 0002500 | SHIN | 600320 | 30,400 | (439) | AQ1 | | | | S337 | Etc.. |

(439) Fees  48  1,274,680  0 %  0 %  (440) 48

| | | (430) | (431) | (432) | (433) | (434) | (435) |
|---|---|---|---|---|---|---|---|
| (428) | Staff | 0 | 0 | 0 | 0 | 0 | 0 |
| (436) | Sum | 44 | 0 | 0 | 0 | 0 | 0 |
| (437) | | 4 | 0 | | | | |

19810218  kim

Please carry out the processing what you want

| | | | | | | Medical code | 11204079 | ANURI Medical Center | | (807) | | | | Inquiry | Close |
|---|---|---|---|---|---|---|---|---|---|---|---|---|---|---|---|
| | | | | | | (801) | | (804) | | (808) | 2006.02 | (812) | Insurance | | |
| | | | | | | (802) | 1,656 | (805) | 1,656 | (809) | 2006.03.14 | (813) | 00 | | |
| | | | | | | (803) | | (806) | | (810) | 4169136 (711) | Sorting | AQ1 | | |

| Specific code | Code name | | | | | | | | | | | | | |
|---|---|---|---|---|---|---|---|---|---|---|---|---|---|---|
| JX999 | The other details | | | | | | | | | | | (817) ⊙ Total | | |
| MS001 | Medication days of the House (Injection agent) | | | | | | | | | | | (818) ○ (828) | | |
| MS002 | Medication days of the House (Injection agent) | | | | | | | | | | | (819) ○ (829) | | |
| MX999 | The other details | | | | | | | | | | | (820) ○ | Code | |
| | | | | | | | | | | | | (821) ⊙ Total | Trust | |
| | | | | | | | | (814) | | | | (822) ○ (830) | | |
| | | | | | | | | | | | | (823) ○ Index | | |
| | | | | | | | (815) | 344 | (816) 344 | | | (824) ○ Precision | | |
| | | | | | | | | 10 | 10 | | | (825) □ | | |
| | | | | | | | | 231 | 231 | | | (826) ○ ⊙ ○ ○ | | |
| | | | | | | | | 2 | 2 | | | (827) ▶ | Finding | |

| (831) | (832) | (833) | (834) | (835) | (836) | (837) | (838) | (839) | (840) | (841) | (842) (843)(844)(845) | (846) |
|---|---|---|---|---|---|---|---|---|---|---|---|---|
| 00037 | ン | 410228-2 | Fixed rate | | | 63,780 | Neurosurgery | AQ1 | | KIM, NAM HYUNG | | N |
| 00024 | ンン | 340325-2 | Fixed rate | | | 64,200 | Neurosurgery | AQ1 | | KIM, NAM HYUNG | | N |
| 00029 | カン | 331215-2 | Fixed rate | | | 64,370 | Neurosurgery | AQ1 | | KIM, NAM HYUNG | | N |
| 00115 | イ | 331015-1 | Fixed rate | | | 94,470 | Neurosurgery | AQ1 | | KIM, NAM HYUNG | | N |
| 00698 | チェ | 500709-2 | Fixed rate | | | 31,700 | Neurosurgery | AQ1 | | KIM, NAM HYUNG | | N |
| 00697 | パク | 400102-1 | Fixed rate | | | 55,630 | Neurosurgery | AQ1 | | KIM, NAM HYUNG | | N |
| 00704 | パク | 350925-2 | Fixed 2ate | | | 309,140 | Neurosurgery | AQ1 | | KIM, NAM HYUNG | | N |
| 00810 | ション | 370903-2 | Fixed rate | | | 17,460 | Neurosurgery | AQ1 | | KIM, NAM HYUNG | | N |
| 00993 | ナム | 600809-2 | Fixed rate 2 | | | 111,750 | Neurosurgery | AQ1 | | KIM, NAM HYUNG | | N |
| 01117 | ション | 310115-1 | Fixed rate 2 | | | 94,780 | Neurosurgery | AQ1 | | KIM, NAM HYUNG | | N | the inquiry is completed. Please carry out the process what you want    19890041 (847)    10 Case    2006.12.08

☐ Selecting specification <W_JFD310>

| Code | The name of item | 1/ii | Unit cost | Daily dosage | Total dosage | (1301) | (1302) Details |
|---|---|---|---|---|---|---|---|
| 1 AA257 | (1303) | | 11,090, | 1, | 2 | 22,180 | |
| 1 B1010 | Hemoglobin ( Photoelectric colorimeter ) | ii | 970, | 1, | 1 | 970 | Y |
| 1 B1020 | Hematocrit | ii | 610, | 1, | 1 | 610 | Y |
| 1 B1040 | The number of eythrocyte | ii | 610, | 1, | 1 | 610 | Y |
| 1 B1050 | the number of leukocyte | ii | 610, | 1, | 1 | 610 | Y |

Sum  Adjustment <W_JFD361>

| (1304)(1305) Code | | | | (1309) C ▶ | (1310) ID ▶ | Storing | Close |
|---|---|---|---|---|---|---|---|

| | Code | | | | | | |
|---|---|---|---|---|---|---|---|
| [08/10] | 1, Examination fees | | | | | | |
| 02 1 | 1 AA257 | | | | | | |
| [08/10] | 9, Checkup fee | | | | | | |
| 01 2 | 1 C3710 | | | | | | |
| [08/10] | 1, Examination fees | | | | | | |
| 02 1 | 1 AA257 (1308) | | | | | | |
| [08/10] | 9, Checkup fee | | | | | | |
| 01 2 | 1 C3710 | Hemoglobin ( Photoelectric colorimeter ) | ii | 970, | 1, | 970 | |
| C | 1 B1010 | | ii | 970, | 1,5 | 485 | 485 s |
| 3 | 1 B1020 | Hematocrit | ii | 610, | 1, | 610 | |
| C | 1 B1020 | | ii | 610, | 1, | 610 | |
| B | 1 B1040 | The number of eythrocyte | ii | 610, | 1,3 | 427 | 427 s |
| 4 | 1 B1040 | | ii | 610, | 1, | 610 | |
| C | 1 B1050 | the number of leukocyte | ii | 610, | 1,2 | 488 | 488 s |
| A | 1 B1050 | | ii | 610, | 1, | 610 | |
| 5 | 1 B1060 | The number of platelet | ii | 610, | 1, | 610 | 610 s |
| C | 1 B1060 | | ii | 730, | 1, | 730 | |
| 6 | | | | 730, | 1, | 730 | 730 s |
| C | | | | | | | |

Fig. 14

| Code | | The name of item | | 1/ii | Unit cost | Daily dosage | Total dosage | (1401) | (1402) Details |
|---|---|---|---|---|---|---|---|---|---|
| 1 | AA257 | (1303) | | | 11,090. | 1, | 2 | 22,180 | |
| 1 | B1010 | Hemoglobin ( Photoelectric colorimeter ) | | ii | 970. | 1, | 1 | 970 | Y |
| 1 | B1020 | Hematocrit | | | | | | | Y |
| 1 | B1040 | The num | ☐ Inquiry of master <W_JFD351> | | | | | -☐× | Y |
| 1 | B1050 | the num | | | | | | Close | |
| (1403)(1404) | | | | | | | | | |
| [08/10] | 1, | | Code | B1010 | (1407) | 970 | (1405) | | |
| 02 1 | 1 AA257 | | (1409) | 101 | (1408) | 1 | 2006.01.01 | | |
| [08/10] | 9, | | Name | Hemoglobin ( Photoelectric colorimeter ) | | | | | |
| 01 2 | 1 C3710 | | | (1411) | (1410) | | Benefits | | |
| [08/10] | 1, | | | | | | | | |
| 02 1 | 1 AA257 | | | | | | | | |
| [08/10] | 9, | | | | | | | | |
| 01 2 | 1 C3710 | Hemoglobin ( Photoelectric colorimeter ) | | ii | 970, | 1, | 1 | 970 | |
| C | 1 B1010 | | | ii | 970, | 1,.5 | 1 | 485 | S |
| 3 | 1 B1020 | Hematocrit | | ii | 610, | 1, | 1 | 610 | |
| C | 1 B1020 | | | ii | 610, | 1,.3 | 1 | 610 | |
| B | 1 B1020 | | | ii | 610, | 1, | 1 | 610 | |
| 4 | 1 B1040 | The number of eythrocyte | | ii | 610, | 1, | 1 | 610 | |
| C | 1 B1040 | | | ii | 610, | 1, | 1 | 610 | S |
| A | 1 B1040 | | | ii | 610, | 1,.2 | 1 | 427 | |
| 5 | 1 B1050 | the number of leukocyte | | ii | 610, | 1, | 1 | 610 | |
| C | 1 B1050 | | | ii | 610, | 1, | 1 | 488 | S |
| 6 | 1 B1060 | The number of platelet | | ii | 730, | 1, | 1 | 730 | |
| C | 1 B1060 | | | ii | 730, | 1, | 1 | 610 | S |
| | | | | | | | | 730 | S |

Inquiry of original bills for specific detail  <W_JFD438>

(1601) 9643089   (1602) 00018

| (1603) | (1604) | Code | Name | Result | |
|---|---|---|---|---|---|
| 1 | 0 | MX999 | The other details | Raloxifene HCl 60mg,1,1,60/ Confirmed by doctor | |
| 1 | 0 | MX999 | 100/100 (1605) 3/E00510381/1,00/60 (prescription)details (*) | | | the inquiry is completed. Please carry out the process you want

Close

Fig. 17

| | Inquiry for the medical care details <₩_JFD439> | | | | _ □ × |
|---|---|---|---|---|---|
| 100/100 | (1701) | | | (1702) | Close |
| Code | The name of item | Daily dosage | Total dosage | | |
| 3 A59500091 | 3/A59500091/ | 100/ 6 | 1, | 0 | |

| 100/100 | (1703) | | | |
|---|---|---|---|---|
| Code | The name of item | Daily dosage | Daily dosage | Total dosage |

| the inquiry is completed. Please carry out the process what you want |
|---|

Fig. 18

| Line number Inquiry of specific details <\\_JFD441> | | |
|---|---|---|
| (18) 9643112 | (18) 00567 (18) □Total | Close |
| (18) Code Name | Result | |
| 3 JT006 DUR (18) | H/1050/A19201391,A12902461/ KIM, Chae Gi  LEE. Su Geun Request to change the prescription due to forbidden component included and received the result. | |

METHOD FOR ELECTRONIC EXAMINATION OF MEDICAL FEES

FIELD OF THE INVENTION

The present invention relates to a method for electronic examination of medical fees, and more particularly to a method for electronic examination of medical fees using a system for electronic examination of medical fees. The system includes a transmit/receive server, a bill examination server, a management terminal and examiner terminals, and communicates with each medical institution server and a national health insurance corporation server. The bill examination server checks any error in medical bills and specifications received from each medical institution server through description inspection, automatic inspection, specialist inspection and computational examination. The bill examination server returns, corrects or adjusts any erroneous bill or specification, or inserts a message into the erroneous bill or specification. The management terminal distributes medical bills and specifications on which computational examination has been completed to the examiner terminals. Each examiner terminal produces a statement of examination adjustment according to the examination results inputted by an examiner during on-screen examination and sends the statement to the bill examination server. Then the bill examination server generates an examination decision file based on the examination results and sends the file to the corresponding medical institution server and simultaneously to the national health insurance corporation server.

BACKGROUND OF THE INVENTION

Under a health insurance system, each medical institution sends a bill for medical fees (including medical benefits) and a specification of services performed by a medical institution to a health insurance examination center. The health insurance examination center examines the medical bill and specification to determine whether the medical fees billed by the medical institution are reasonable, and sends the examination results to the national health insurance corporation. The national health insurance corporation pays the medical fees to the medical institution based on the examination results informed from the health insurance examination center.

The health insurance examination center distributes bills and specifications submitted by medical institutions, such as special sanatoriums, general hospitals, dental clinics, herb medical hospitals or clinics, pharmacies and public health centers, to examiners and lets the examiners examine the bills and specifications and thereby determine whether the medical services offered and the medical fees billed are right and reasonable. Recently, due to the increasing number of medical institutions and a growing diversity in the kinds of diseases reported, the types of medical practice and the kinds of drugs and medications have also increased, thereby causing the examiners' ever-increasing workload in examination of medical bills and specifications. Particularly, the examiners have difficulties when examining medical bills and specifications relating to various new drugs and medications prescribed for the treatment of new kinds of diseases. Since the medical fees are paid to the medical institutions according to the examination procedure and progress in the health insurance examination center, the working efficiency of the examiners in the health insurance examination center is significant to the medical institutions. Therefore, it is highly required to improve the efficiency in examination of medical bills and specifications by the health insurance examination center.

SUMMARY OF THE INVENTION

Accordingly, the present invention has been made to solve the above-mentioned problems occurring in the prior art, and an object of the present invention is to provide a method for electronic examination of medical fees using a medical fee electronic examination system which includes a transmit/receive server, a bill examination server, a management terminal and examiner terminals, and which communicates with medical institution servers and a national health insurance corporation server, said method comprising the steps of: checking any error in medical bills and specifications received from each medical institution server in the bill examination server through description inspection, automatic inspection, specialist inspection and computational examination, and returning, correcting or adjusting any erroneous bill or specification, or inserting a message into the erroneous bill or specification; distributing the medical bills and specifications on which computational examination has been completed to the examiner terminals by the management terminal; producing in each examiner terminal a statement of examination adjustment according to the examination results inputted by an examiner during on-screen examination and sending the statement to the bill examination server from the examiner terminal; and generating an examination decision file based on the examination results in the bill examination server and sending the file to a corresponding medical institution server and simultaneously to the national health insurance corporation server from the bill examination server.

In order to accomplish the above object, there is provided a method for electronic examination of medical fees using a medical fee electronic examination system which includes: a transmit/receive server having a primitive database and communicating with each medical institution server through a communication relay center and a network; a bill examination server having an examination database, an examination reference database and a portal receipt database and communicating with each medical institution server, a health insurance corporation server and the transmit/receive server; a management terminal and examiner terminals communicating with the bill examination server, said method comprising the steps of: a bill and specification receiving step in which the transmit/receive server accesses the communication relay center, receives medical bills and specifications sent from each medical institution and stores the received medical bills and specifications in the primitive database; a bill and specification receipt registering step in which the bill examination server receives the bills and specifications from the transmit/receive server, assigns a receipt number to each bill, registers the receipt and stores the received bills and specifications in the examination database; a description inspection step in which the bill examination server inspects descriptions in the received bills and specifications, including basic information on each medical institution and a bill classification, and sending a notice of return to a corresponding medical institution server if any error or omission is detected in descriptions of a bill or a specification; an automatic inspection step in which the bill examination server performs an automatic inspection on the specifications on which description inspection has been completed in order to detect any error in items billed, including a reference price applied, fees calculated and benefits applied for, and corrects the detected error or inserts a message into a corresponding specification; a specialist inspection step in which a specialist checks the specifications on which automatic inspection has been completed or corrected specifications to determine whether items, such as medical fee, drug price, drug dispensing fee and injection fee, are correct, and corrects any incorrect item or inserts a message into a corresponding specification; a computational examination step in which the bill examination server performs a computational examination on the specifications on which specialist inspection has been completed in order to detect any treatment or dosage exceeding a preset limit in items including cold and medication use evaluation, and adjusts a billed amount or inserts a message into a corresponding specification if an excessive treatment or dosage is detected; a bill and specification distribution step in which the management terminal receives a list of bills and specifications, on which computational examination has been completed and which are subject to on-screen examination, from the bill examination server and distributes the bills and specifications to the examiner terminals; an on-screen examination result sending step in which each examiner terminal receives the distributed bills and specifications from the bill examination server, allows an examiner to input examination results for the bills and specifications, and sends the inputted examination results to the bill examination server; and an examination decision file generating and sending step in which the bill examination server generates an examination decision file based on the examination results received from each examiner terminal and adjusted bills and specifications, and sends the examination decision file to the medical institution server and the national health insurance corporation server.

In the description inspection step, if over a predetermined rate of specifications attached to a bill are erroneous, a notice of return will be sent to return the bill and all the specifications attached thereto.

After the automatic inspection step, the method for electronic examination of medical fees according to the present invention may further comprise: an erroneous specification sending step in which the bill examination server sends a specification having an error in automatic inspection items which are assigned automatic inspection codes to the portal receipt database; and a corrected specification receiving step in which the bill examination server receives a specification with the error corrected by the medical institution server and performs an automatic inspection on the corrected specification. The automatic inspection items assigned automatic inspection codes may include at least one of an error in estimation of a unit price, an error in a fee code, an error in application of a reference medical fee, an error in calculation of a billed amount, an item of non-benefits or user charge in whole, a failure to submit a reference document, an error in code classification, an error or omission in the inspection authority number or request date of inspection if inspection was entrusted to an inspection authority, and arbitrary direct dispensing.

In the automatic inspection step, the bill examination server may refer to a master file including information necessary for the examination of automatic inspection items and stored in the examination reference database.

In the computational examination step, the computational examination on the cold item is performed to check a specification relating to acute respiratory infection and adjust the billed amount or indicate the adjustment in a statement of examination adjustment if any treatment or dosage exceeding a preset limit is detected in the specification. Also, the inspection on the medication use evaluation item is performed to detect any improper prescription of medications which are prohibited to be taken together or at certain ages, and indicate the improper prescription in the statement of examination adjustment.

The management terminal displays a list of bills to be distributed according to predetermined conditions, such as dates of receipt and medical institutions, and distributes the bills and specifications attached thereto to selected examiner terminals using an automatic distribution or division distribution method.

The on-screen examination result sending step may further include: sending the bills and specifications distributed to each examiner terminal to an examination commissioner terminal to entrust the examination of the bills and specifications; and sending examination results inputted by the examination commissioner terminal to the bill examination server.

After the examination decision file generating and sending step, the method for electronic examination of medical fees according to the present invention may further comprise: an eligibility appraisal result receiving step in which the bill examination server receives results of appraisal of medical care receivers' eligibility from the national health insurance corporation server and updates information stored in the examination reference database according to the eligibility appraisal results.

In the on-screen examination result sending step, the examiner terminal indicates any adjustment inputted by at least one method of singular adjustment, aggregate queue adjustment, plural adjustment, compulsive adjustment and associated adjustment in the statement of examination adjustment.

In the on-screen examination result sending step, the examiner terminal indicates an adjustment made on at least one of items, including calculation error, insufficiency to receive benefits, non-benefit item and a 100/100 user charge item, in the statement of examination adjustment.

Also, in the on-screen examination result sending step, the examiner terminal displays medical service inquiry data. When the 100/100 user charge item is clicked, 100/100 medical service inquiry data is displayed. When a particular item is clicked again, details of the particular item are displayed.

BRIEF DESCRIPTION OF THE DRAWINGS

The above and other objects, features and advantages of the present invention will be more apparent from the following detailed description taken in conjunction with the accompanying drawings, in which:

FIG. 3 shows distribution quantity registration data displayed on a management terminal;

FIG. 4 shows division distribution registration data displayed on a management terminal;

FIG. 6 shows a display screen of an examiner terminal which displays a bill selection mode;

FIG. 7 shows a display screen of an examiner terminal which displays a specification selection mode for selecting specifications according to the search condition (same medical care receiver);

FIG. 8 shows a display screen of an examiner terminal which displays a specification selection mode for selecting specifications corresponding to a specific item;

FIG. 9 shows a display screen of an examiner terminal which displays a specification selection mode for selecting a specification corresponding to a specification serial number;

FIG. 10 shows a display screen of an examiner terminal which displays medical treatment data included in a specification of medical fees billed on a monthly basis;

FIG. 11 shows a display screen of an examiner terminal which displays medical treatment data included in a specification of medical fees billed on a daily basis;

FIG. 12 shows a display screen of an examiner terminal which displays medical treatment data included in a specification sent from a pharmacy;

FIG. 13 shows an aggregate queue adjustment performed on an examiner terminal;

FIG. 14 shows a master file search window generated on a display screen of an examination terminal;

FIG. 15 shows general specification items displayed on an examiner terminal;

FIG. 16 shows original billing data displayed on an examiner terminal;

FIG. 17 shows 100/100 user-charge treatment data displayed on an examiner terminal;

FIG. 18 shows data displayed upon a line number selection on an examiner terminal;

FIG. 19 shows a medical treatment specification of a public health center which is displayed on an examiner terminal for on-screen examination; and FIG. 20 shows medical treatment data displayed on an examiner terminal upon selection of a specification of a public health center.

DETAILED DESCRIPTION OF THE INVENTION

Figure 1:
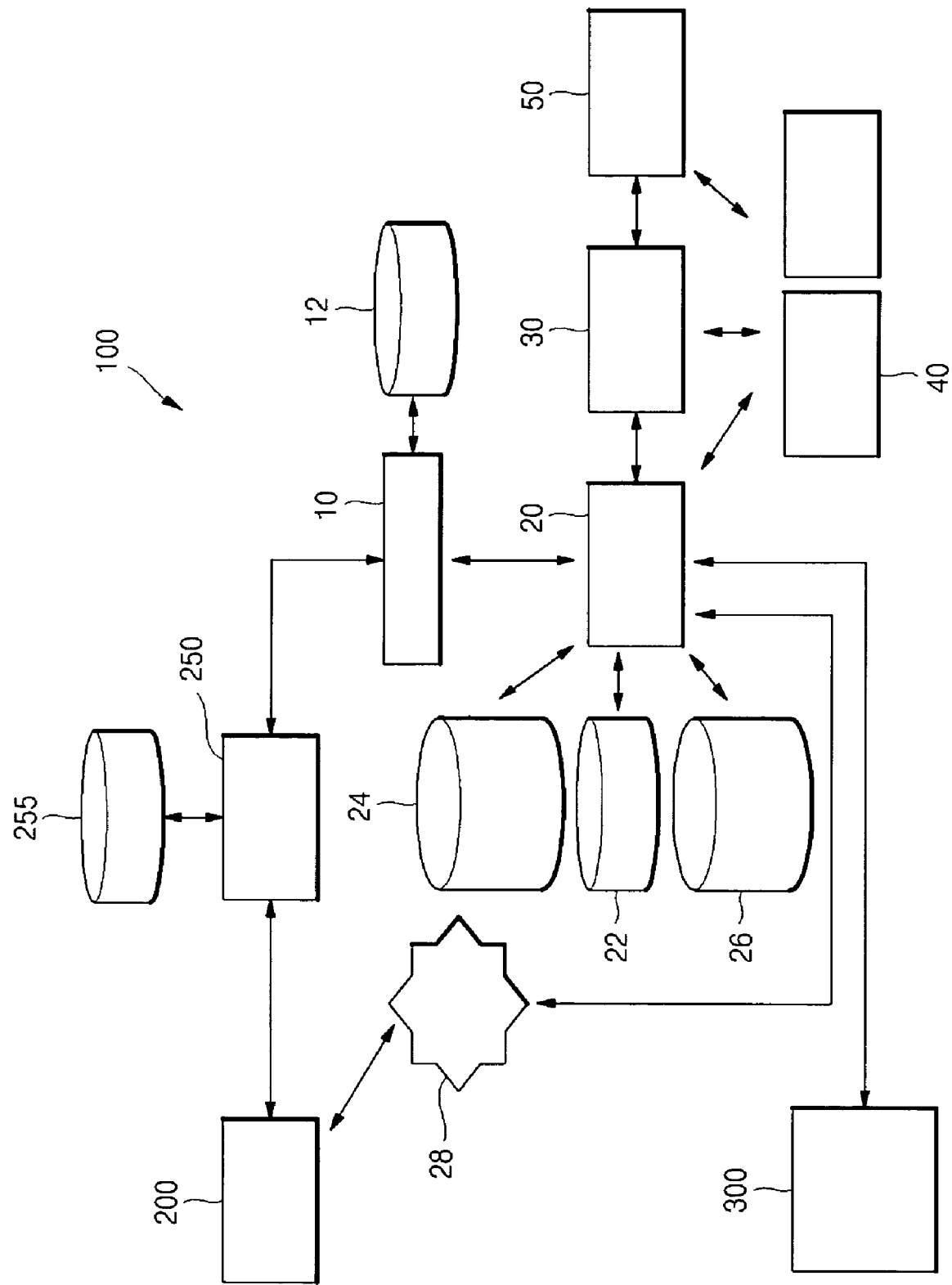
FIG. 1 is a block diagram of a medical fee electronic examination system for carrying out a method for electronic examination of medical fees according to a preferred embodiment of the present invention.

Hereinafter, a preferred embodiment of the present invention will be described with reference to the accompanying drawings. Descriptions of well-known functions and constructions are omitted for clarity and conciseness. In the following description, the same reference numeral will be used for the same element.

A system 100 for electronic examination of medical fees according to a preferred embodiment of the present invention will be explained. FIG. 1 is a block diagram of the medical fee electronic examination system 100 for carrying out a method for electronic examination of medical fees according to a preferred embodiment of the present invention.

Referring to FIG. 1, the medical fee electronic examination system 100 includes a transmit/receive server 10, a bill examination server 20, a management server 30, a plurality of examiner terminals 40 and an examination commissioner terminal 50. The medical fee electronic examination system 100 may further include a plurality of branch bill examination servers (not shown) installed in local branches of a health insurance examination center and communicating with the bill examination server 20. The bill examination server 20 has an examination database 22, a portal receipt database 24 and an examination reference database 26. The transmit/receive server 10 has a primitive database 12.

The bill examination server 20 communicates with a medical institution server 200 through the transmit/receive server 10 and a communication relay center 250. Also, the bill examination server 20 communicates with a national health insurance corporation server 300 through a network. The bill examination server 20 controls transmission and receipt of medical bills, specifications and examination decision files in communication with the medical institution server 200 and the national health insurance corporation server 300. In addition, the bill examination server 20 controls the overall process of electronic examination of medical fees in communication with the transmit/receive server 10, management terminal 30, examiner terminals 40 and judge terminal 50.

The bill examination server 200 authenticates the medical institution server 200 which can send a request for medical fee payment to the health insurance examination center, and assigns a medical code which is a unique identifier to the medical institution server 200. The bill examination server 20 stores basic information inputted to authenticate the medical institution server 200 in the examination reference database 26 and manages the stored basic information. The bill examination server 20 may separately store the results of examination of medical bills and specifications sent from the medical institution server 200 in the examination reference database 26 according to the kinds of medical institutions. The results of examination can be offered to examiners in order to be used as reference data for determining a billing trend of the medical institutions and thereby to improve the examination efficiency.

The bill examination server 20 receives a medical bill and specification sent from the medical institution server 200 and stored in the communication relay center 250 of a communication relay company (for example, KT Corporation), and sends a notice of receipt or a notice of return. More specifically, the bill examination server 20 controls the transmit/receive sever 10 to deliver a medical bill and specification received from the communication relay center 250 and stored in the primitive database 12. The bill examination server 20 stores the medical bill and specification received from the transmit/receive server 10 in the examination database 22. Also, the bill examination server 20 sends a notice of receipt or a return notice for the medical bill and specification to the medical institution server 200 through the transmit/receive server 10 and the communication relay center 250. The bill examination server 20 can directly send the notice of receipt to the medical institution server 200 through the transmit/receive server 10 or the network.

Each bill and specification is prepared according to EDI (Electronic Data Interchange) of a defined format MIG (Message Implementation Guideline Abstracts) and sent in form of an encrypted electronic document from the medical institution server 200 to the communication relay center 250. The communication relay center 250 stores the electronic documents of bills and specifications in a relay database 255 and maintains the documents in a state receivable by the transmit/receive server 10. The medical institution server 200 prepares bills and specifications at regular billing intervals which are generally set according to medical services, and sends the prepared bills and specifications to the communication relay center 250. The billing intervals can be set to once a week in case of hospital treatment or once a month in case of outpatient medical treatment. Also, pharmacy drug dispensing fees can be billed once a week or once a month.

The bill examination server 20 receives bills and specifications stored in the primitive database 12 and processes each bill and specification into a data format which can be examined on a screen. The processed data is stored in the examination database 22. For the management purpose, the bill examination server 20 assigns a receipt number consisting of consecutive digits to each bill, while assigning a specification serial number to the specification attached to each bill. The bill examination server 20 registers the receipt of the bills and specifications and manages the bills and specifications stored in the examination database 22.

The bill examination server 20 checks each received bill and specification through description inspection, automatic inspection, specialist inspection and computational examination. After checking, the bill examination server 20 generates a statement of examination adjustment and stores the statement in the examination database 22. Also, the bill examination server 20 generates a list of bills and specifications subject to on-screen examination among those undergone a computational examination, and stores the generated list in the examination database 22. The list will be sent to the management terminal 30 when requested. The bill examination server 20 classifies medical institutions into green authenticated institutions, index institutions and precise examination institutions according to the examinee selection standards established to improve examination efficiency and effects. The bill examination server 20 may reflect the rate of returns, rate of corrections and rate of adjustments for the medical bills and specifications received from each medical institution in the classification of medical institutions. The green authenticated institutions are medical institutions which voluntarily and faithfully provide medical care benefits and requests payment of the fees as prescribed in the related regulations, such as the National Health Insurance Act. For the bills and specifications received from the green authenticated institutions, the bill examination server 20 carries out only a computational examination of the specifications and examination of additional or complementary bills, omitting other examination or inspection procedures. The index institutions refer to medical institutions which show a good billing attitude. For the bills and specifications received from the index institutions, the bill examination server 20 carries out basic description inspection and computational examination, omitting other examination or inspection procedures. For the bills and specifications received from the precise examination institutions, the bill examination server 20 carries out on-screen examination and examiner's examination after computational examination. The classification is included in the information on each medical institution.

The bill examination server 20 receives examination closing information from the management terminal 30 and generates an examination decision file based on the bills and specifications and the statements of examination adjustment which are received from the examiner terminals 40 or the examination commissioner terminal 50. The bill examination server 20 stores the examination decision file in the examination database 22. In other words, the management terminal 30 distributes bills and specifications stored in the examination database 22 to the plurality of examiner terminals 40. The management terminal 30 closes the examination according to the on-screen examination results transmitted from the examiner terminals 40 or the examination commissioner terminal 50, and sends the examination closing information to the bill examination server 20. The bill examination server 20 generates an examination decision file based on the on-screen examination results which include adjusted bills, specifications and statements of examination adjustment.

The bill examination server 20 sends the examination decision file generated based on the examination results and transmitted from the examiner terminals 40 and the examination commissioner terminal 50 to the transmit/receive server 10 and the national health insurance corporation server 300. The transmit/receive server 10 sends the examination decision file received from the bill examination server 20 to the medical institution server 200 directly or via the communication relay center 250. The national health insurance corporation server 300 appraises eligibility to receive health insurance benefits for the medical care receivers named in the examination decision file and sends the eligibility appraisal results to the bill examination server 20.

The bill examination server 20 updates information on medical care receivers eligible to receive health insurance benefits, which is stored in the examination reference database 26, based on the eligibility appraisal results included in the specifications on which examination decision has been rendered.

The transmit/receive server 10 accesses the communication relay center 250 to receive bills and specifications sent from the medical institution server 20 by dates of receipt. The transmit/receive server 20 stores the received bills and specifications in the primitive database 12 and closes receiving. Also, the transmit/receive server 10 may convert the bills and specifications into an appropriate format usable in the medical fee electronic examination system in place of the bill examination server 20 and then store the converted data in the primitive database 12. At this time, the transmit/receive server 10 separately stores the converted bills and specifications in the primitive database 12. In addition, the transmit/receive server 10 receives an examination decision file from the bill examination server 20 and resends the file to the medical institution server 200.

The examination database 22 communicates with the bill examination server 20, and stores received bills, specifications and receipt details. The examination database 22 stores information on the distribution of the bills and specifications sent from the bill examination server 20. The examination database 22 stores bills and specifications adjusted after completion of examination and statements of examination adjustment. In addition, the examination database 22 stores examination decision files generated in the bill examination server 20.

The examination reference database 26 communicates with the bill examination server 20, and stores a master file including medical service fees, drug prices, material prices, kinds of diseases and fee calculation guidelines which are necessary for automatic inspection, specialist inspection and computational examination. The examination reference database 26 stores a medical institution file including information on each medical institution, such as a medical code, facility, equipment, employees, closing of business, reopening, change in jurisdiction, acknowledged month of treatment. The examination reference database 26 also stores an access identifier and a password which are assigned to each medical institution during the authentication procedure for accessing the portal receipt database 24. The access identifier can be the same as the medical code. In such a case, the access identifier is not additionally stored. The examination reference database 26 also stores information on medical care receivers who are eligible to receive health care insurance benefits. Thus, during inspection on descriptions in the specifications, the bill examination server 20 can check whether the medical care receivers named in the specifications are eligible to receive health insurance benefits. The bill examination server 20 updates the examination reference database 26 based on the eligibility appraisal results included in the specifications on which examination decision has been rendered.

The portal receipt database 24 communicates with the bill examination server 20 and the medical institution server 200, and stores erroneous specifications in which errors have been detected during automatic inspection on the specifications. The portal receipt database 24 accesses the medical institution server 200 and stores specifications with errors corrected. The bill examination server 20 accesses the portal receipt database 24 and receives the corrected specifications to perform automatic inspection on the corrected specifications.

The management terminal 30 communicates with the bill examination server 20 and the examiner terminals 40, and receives a list of bills and specifications returned or corrected after description inspection, automatic inspection and computational examination and subject to on-screen examination from the bill examination server 20. Then the management terminal 30 distributes the bills and specifications to the examiner terminals 40. When receiving a notice of examination completion from the examiner terminals 40, the management terminal 30 closes the examination on the distributed bills and specifications.

To be specific, when the list of bills and specification subject to on-screen examinations is received, the management terminal 30 inputs distribution quantity conditions, such as a date of receipt, treatment areas and same medical care receivers, in the list and decides examiners who will examine the bills and specifications. The management terminal 30 may distributes new bills and specifications under specific conditions or re-distributes corrected bills and specifications. When distributing the bills and specifications to the examiners, the management terminal 30 registers each examiner as an examiner-in-charge.

The management terminal 30 sends distribution information, including a list of bills and specifications distributed to the examiners, to the bill examination server 20. Then the bill examination server 20 stores the received distribution information in the examination database 22. If requested, the management terminal 30 will access the bill examination server 20 to receive information about the status of distribution to each examiner and the department of each examiner and displays the information. When the on-screen examination of the bills and specifications is completed, the management terminal 30 closes the examination of the bills and specifications and sends examination closing information to the bill examination server 20.

The examiner terminals 40 communicate with the bill examination server 20 and the management terminal 40. The examiner terminals 40 receive the list of distributed bills and specifications and display the list. Each examiner terminal 40 displays details of a selected bill or specification so that the examiner can perform an on-screen examination. Also, each examiner terminal 40 displays the examiner's input according to the examiner results on the examination screen and sends the input data to the bill examination server 20. More specifically, the examiner inputs the results of general description examination which checks any error in the medical institution information and the results of examination on medical service fees, such as consult fee, hospitalization fee, examination fee, medication fee, dispensing fee and injection fee. Each examiner terminal 40 delivers the examination results inputted by the examiner to the bill examination server 20.

The examiner terminals 40 communicate with the examination commissioner terminal 50. The examiner terminals 40 sends information on bills and specifications which are required to be examined by the examination commissioner, and requests the examination commissioner to examine the bills and specifications.

The examination commissioner terminal 50 communicates with the bill examination server 20 and the examiner terminals 40. The examination commissioner terminal 50 displays bills and specifications which are requested to be examined by the examination commissioner. The examination commissioner is a specialized examiner who can examine bills and specifications with medical knowledge and determine the appropriateness of medical services performed. The results of examination by the examination commissioner are inputted in the examination commissioner terminal 50. Since the configuration and functions of the examination commissioner terminal 50 are identical or similar to those of the examiner terminals 40, no further explanation of the examination commissioner terminal 50 will be offered.

Branch bill examination servers (not shown) installed in local branches of the health insurance examination center communicate with the bill examination server 20 installed in the head office of the center through a network. Each branch bill examination server also communicate with branch examiner terminals 40 and a branch management terminal 30 which are installed in a local branch. For the bills and specifications examined in branches, the branch bill examination servers send the examination results to the bill examination server 20 of the head office. The branch examiner terminals 40 and the branch management terminal 30 have the same or similar configurations and functions as the examiner terminals 40 and the management terminal 30 communicating with the bill examination server 20. Accordingly, a detailed explanation of the branch examiner terminals 40 and the branch management terminal 30 will be omitted.

The medical institution server 200 sends medical bills and specifications to the transmit/receive server 10 or the bill examination server 20 of the health insurance examination center through the communication relay center 250, and receives notices of receipt, notices of return and examination failure information through the communication relay center 250. Medical institutions include special sanatoriums, general hospitals, surgical clinics, dental clinics, herb medical hospitals or clinics, pharmacies and public health centers which are associated with medical care services and qualified to bill medical fees to the health insurance examination center. In order to sends medical bills and specifications, the medical institution server 200 requests the bill examination server 20 of the health insurance examination center to authenticate. During authentication of the medical institution server 200, the bill examination server 20 assigns a medical code which is a unique identifier. The medical institution server 200 can access the communication relay center 250 using the assigned medical code and send the bills and specifications.

Also, the medical institution server 200 can access the portal receipt database 24 to correct any specification which cannot be examined due to an error or omission detected during description inspection and to correct any erroneous bill or specification according to the results of automatic inspection. In order to access the portal receipt database 24, the medical institution server 200 first accesses a homepage 28 of the health insurance examination center and receives authentication. At this time, an access identifier is assigned. The access identifier can be same as a medical code assigned to each medical institution.

The national health insurance corporation server 300 communicates with the bill examination server 20 of the health insurance examination center. The national health insurance corporation server 300 appraises eligibility to receive health insurance benefits for the medical care receivers named in the bills and specifications based on the examination decision file sent from the bill examination server 20, and sends the eligibility appraisal results to the bill examination server 20 of the health insurance examination center.

Figure 2:
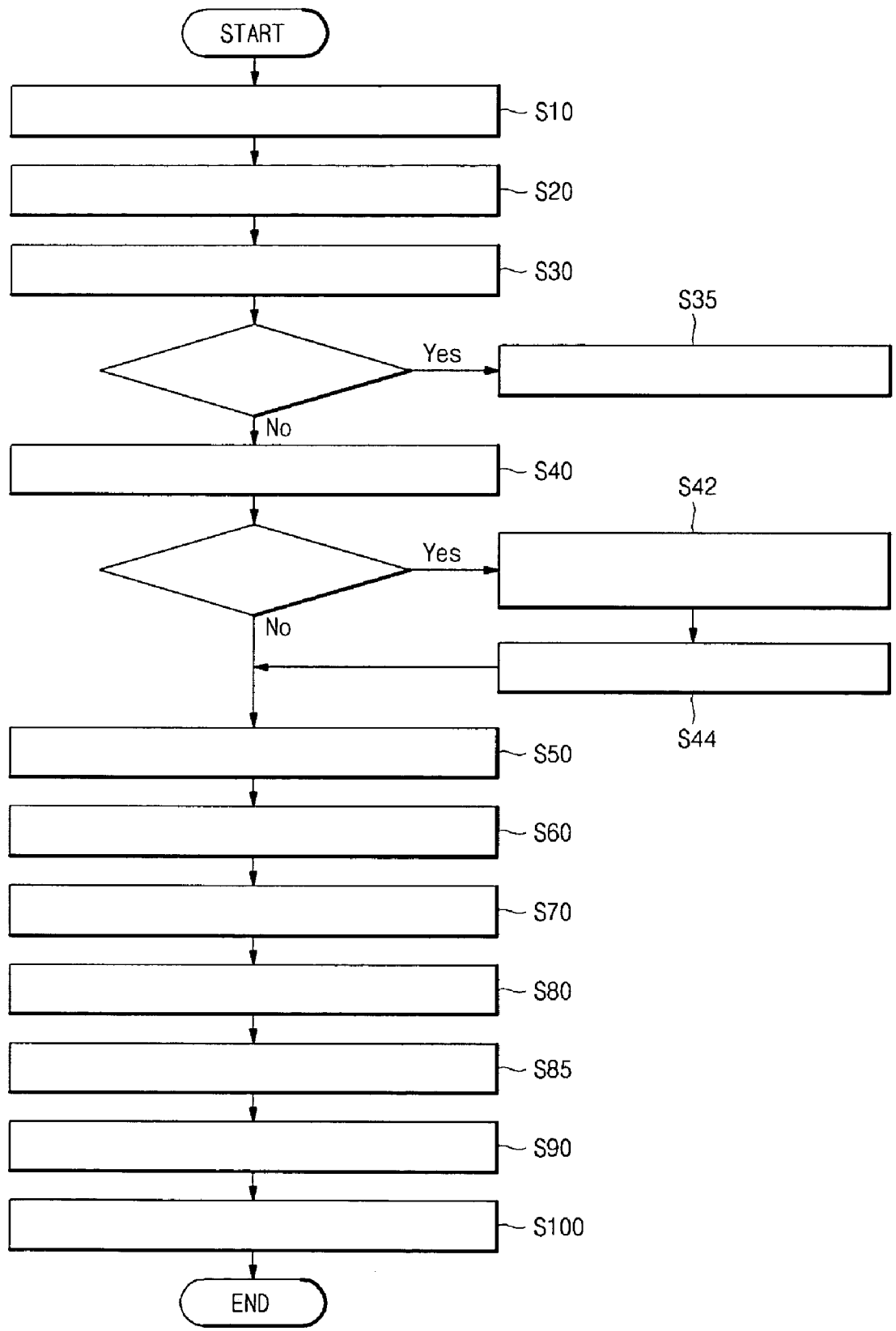
FIG. 2 is a flowchart showing a process of electronic examination of medical fees according to a preferred embodiment of the present invention.

Hereinafter, a process for electronic examination of medical fees according to a preferred embodiment of the present invention will be explained. FIG. 2 is a flowchart showing a process of electronic examination of medical fees according to a preferred embodiment of the present invention.

Referring to FIG. 2, the electronic examination process includes the steps of: receiving medical bills and specifications (S10); registering the receipt of the bills and specifications (S20); inspecting descriptions in the bills and specifications (S30); performing an automatic inspection on the specifications (S40); performing a specialist inspection on the specifications (S50); performing a computational examination of the specifications (S60); distributing the bills and specifications (S70); sending results of an on-screen examination (S80); and generating and sending an examination decision file (S90). The process of electronic examination of medical fees may further include the step of: returning any erroneous bills and specifications (S35); sending an erroneous specification to the portal receipt database (S42); and performing an automatic inspection on a corrected specification (S44). The process of electronic examination of medical fees may further include the step of sending results of an on-screen examination conducted by an examination commissioner (S85). Also, the process may further include the step of receiving eligibility appraisal results for medical care receivers (S100).

In the step of receiving medical bills and specifications (S10), the transmit/receive server 10 accesses the communication relay center 250 and receives the medical bills and specifications sent from the medical institution server 200. The medical institution server 200 converts each bill and specification into an EDI format and sends the converted data to the communication relay center 250 which will stored the received data in the relay database 255. The transmit/receive server 10 receives each medical institution's bills and specifications which were delivered to the communication relay center 250, and converts the bills and specifications into a format that can be used in the bill examination server 20. The converted format of bills and specifications can be stored in the primitive database 12. In other words, the transmit/receive server 10 converts the bills and specifications sent in an EDI format into a format usable in the bill examination server 20. The transmit/receive server 10 determines the data validity and compatibility of the bills and specifications, and stores only the valid and compatible bills and specifications in the primitive database 12. At this time, the transmit/receive server 10 may separately convert the bills and specifications and store the converted bills and specifications in the primitive database 12. In addition, the transmit/receive server 10 may separately register and manage details of receiving information regarding the received bills and specifications.

In the step (S20) of registering the receipt of the bills and specifications, the bill examination server 20 receives the bills and specifications stored in the transmit/receive server 10, assigns a receipt number to each bill and registers the receipt details. The bill examination server 20 checks specification serial numbers assigned to the specifications attached to each bill and stores the specification serial numbers in the examination database 22. The bill examination server 20 may send a notice of receipt, which was prepared in a predetermined format to verify the receipt of the bills and specifications, to the medical institution server 200 through the communication relay center 250.

In the step (S30) of inspecting descriptions in the bills and specifications, the bill examination server 20 checks descriptions in the received bills and specifications. Each bill prepared in the medical institution server 200 includes descriptions, such as a document form number, basic information of the pertinent medical institution, bill classification, number of billing cases, total amount of medical care benefits, user (patient) charge and total billed amount. The bill examination server 20 checks whether there is any error in the basic information on the medical institution based on the medical institution information in a medical institution file which was stored in the examination reference database 26. Also, the bill examination server 20 checks any error or omission in the descriptions of each bill, for example, in the document form number, date of medical treatment, number of billing cases, billed amount, accreditation authority, or days of medical treatment. When an error or omission in the descriptions, the bill examination server 20 sends a notice of return of the pertinent bills and specifications to the medical institution server 200. In addition, the bill examination server 20 sends a notice of return when any bills and specifications are sent in violation of predetermined billing intervals (for example, when bills and specifications are sent twice a week in case of hospital treatment).

Generally, a plurality of specifications are attached to one bill and assigned respective specification serial numbers. The specifications describe a medical code of the pertinent medical institution, details (personal data) of each actual medical service receiver, start date of medical service, visit date, dispensing date, details of prescription, details of dispensing, prescription serial number, breakdown of the bill, total amount of medical care benefits, user charge, billed amount and so on. The bill examination server 20 checks any error or omission in the descriptions of the specifications, for example, in the start date of medical service, visit date or dispensing date. Also, the bill examination server 20 checks the specifications to detect medical care benefits applied for after the date of receipt of the specifications, erroneous description of a medical treatment date which is earlier or later than the opening or closing date of a medical institution, errors in dispensing or prescription details, omission of a prescription serial number, medical treatment applicable to a different sex, double billing, or unqualified medical care receivers who cannot receive medical benefits. When any error or omission is detected in a specification, the bill examination server 20 classifies the specification into "unexaminable" and stops further examination procedure. The bill examination server 20 sends information on the unexaminable specification together with an examination decision file to the medical institution server 200. In addition, if over a predetermined rate (for example, 30%) of specifications attached to a bill are determined to be unexaminable, the bill examination server 20 will then notify the medical institution server 200 of the examination failure by sending a return notice including information, such as the receipt number of the bill. Since the bill examination server 20 picks up and returns bills and specifications having an error or omission in descriptions, it can prevent further examination procedure for such erroneous bills and specifications, and thereby improve the examination efficiency.

In the step (S40) of performing an automatic inspection on the specifications, the bill examination server 20 checks whether there is any error in breakdown of charges in the bills and specifications on which description inspection has been completed. The bill examination server 20 performs an automatic inspection on the bills and specification on which description inspection has been completed, and detects any error in a reference price applied (such as a medical service fee, drug price or doctor fee), calculation of amount billed, an item for which medical care benefits were applied, or a medical service code. A master file which includes information on the automatic inspection items and information necessary for the automatic inspection on each item is stored in the examination reference database 26 of the bill examination server 20. The bill examination server 20 performs the automatic inspection on the object items based on the information in the master file. The automatic inspection items are assigned automatic inspection codes if separate management is required. Therefore, the bill examination server 20 can perform the automatic inspection using the automatic inspection codes. For example, the bill examination server 20 may assign an automatic inspection code "A" to an error in estimation of a unit price, "AK" to an error in a fee code, "B" to an error in application of a reference medical fee, "D" to an error in calculation of a billed amount, "E" to an item of non-benefits or an item of user charge in whole, "F" to a failure to submit a reference document, "K" to an error in code classification, "L" to an error or omission in the inspection authority number or request date of inspection if inspection was entrusted to an inspection authority, and "U" to arbitrary direct dispensing. When a unit price in a specification is different from that in the master file stored in the examination reference database 26, the automatic inspection code "A" is assigned. The automatic inspection code "AK" is assigned when the basic five digits or characters of a fee code are correct but three additional digits or characters are incorrect. The automatic inspection code "B" is assigned when the medical fee is different from the fee in the master file. The automatic inspection code "D" is assigned when the billed amount is different from the actually calculated amount. The automatic inspection code "E" is assigned when an item of non-benefits or an item of user charge in whole is billed. The automatic inspection code "F" is assigned when a corresponding code is not included in the basic information on the medical institution or when an actual purchase price code shows a purchase of an item after lapse of two years from the medical service start date. The automatic inspection code "K" is assigned when a corresponding code is not included in the master file or when a code classification is omitted or erroneous. The automatic inspection code "L" is assigned when there is an error or omission in an inspection authority number or an inspection request date in case of entrusted inspection. The automatic inspection code "U" is assigned when there is an error or omission in description of exceptions in case of a medicine for internal or external application. When a general or insignificant error is detected during the automatic inspection, the bill examination server 20 adjusts the amounts of a pertinent item or generates a message. On the other hand, when an error is detected in an item assigned an automatic inspection code, the bill examination server 20 sends related information to the portal receipt database 24 so that the medical institution server 200 can directly correct the error. The adjustment made by the bill examination server 20 means direct adjustment of an erroneous item billed. The generation of a message means insertion of a message into a pertinent specification or into a pertinent item line of the specification so that an examiner can see the message during an examiner inspection process. The bill examination server 20 may indicate the adjustment or message according to the results of automatic inspection in a statement of examination adjustment.

In the step (S42) of sending an erroneous specification to the portal receipt database, the bill examination server 20 sends a specification having an error detected in an item assigned an automatic inspection code during the automatic inspection to the portal receipt database 24. To be specific, when an error is detected in an item assigned an automatic inspection code "A," "F," "K," "L" or "U" during the automatic inspection, the bill examination server 20 sends the erroneous specification to the portal receipt database 24 so as to store it. At this time, the bill examination server 20 may inform the medical institution server 200 that the erroneous specification detected during the automatic inspection is stored in the portal receipt database 24.

In the step (S44) of performing an automatic inspection on a corrected specification, the bill examination server 20 receives a specification with the error in the automatic inspection item corrected from the portal receipt database 24 and performs an automatic inspection again on the corrected specification. The medical institution server 200 accesses the portal receipt database 24, corrects the error in the automatic inspection item, and stores the corrected specification in the portal receipt database 24. At the same time, the medical institution server 200 informs the bill examination server 20 of the correction. Accordingly, the bill examination server 20 can receive the corrected specification and perform the automatic inspection again. Since the automatic inspection on the corrected specification is the same as the automatic inspection process of S40, no further explanation thereof will be made.

In the step (S50) of performing a specialist inspection on the specifications, the bill examination server 20 performs a specialist inspection on the specifications on which automatic inspection has been completed. The specialist inspection is performed on preset items subject to the specialist inspection and preceding items. The bill examination server 20 checks any error in a specialist inspection code assigned to each object item by sub-task. When detecting an error, the bill examination server 200 adjusts the erroneous item or offers a message to the examiner to be reflected onto the examination. The bill examination server 20 may adjust each line of a specification or an entire specification, or include a message in each line or in the entire specification. Also, the bill examination server 20 may indicate the adjustment in the statement of examination adjustment.

The object items of a specialist inspection are items that can be inspected by a specialist using inspection standards formalized based on data, such as guidelines for estimating medical fees and drug fees (for example, reference price tables for medical service fees) and administration interpretations of the Ministry of Health and Welfare. For example, in the reference price tables for medical service fees, details of inspection are classified by sub-tasks and formed to a tree. Items corresponding to the branches of the tree are assigned specialist inspection codes. Inspection range and content of each item is determined according to the assigned specialist inspection code. Each sub-task may be assigned an ID. At this time, ID numbers are assigned by broad classification of sub-tasks (chapter classification in the reference price table for medical service fees), middle classification (estimation guideline classification in the broad classification) and narrow classification (serial numbers in the middle classification). Therefore, each sub-task is a combination of items which will be inspected based on similar or identical examination guidelines grouped from each reference price table. Items (such as medical fee, drug price and doctor's fee) of each sub-task are subject to the specialist inspection. The preceding items are associated with the items subject to the specialist inspection by sub-task. It is necessary to check the presence of the preceding items which are also set on medical fee, drug price, doctor's fee and so on. More specifically, the specialist inspection items can be an age addition guideline, holiday addition, personnel status of a medical institution, special management, report for equipment, disease comparison, items that cannot be estimated simultaneously, medication dispensing fee, number of injections allowed, drug and medication examination guideline, and an error in billing method.

In the step (S60) of performing a computational examination, the bill examination server 20 performs a computational examination of the specifications on which specialist inspection has been completed. The computational examination is to examine items previously set to improve examination efficiency or by policy. The items relate to cold, medication use evaluation, cough suppressant/expectorant, dental treatment, childbirth treatment, and so on.

The computational examination on the cold item is performed to check a specification relating to acute respiratory infection which is a relatively simple and frequently infecting disease requiring outpatient clinic or hospital treatment. More specifically, a specification describing three or less visit days for the treatment of acute respiratory infection can be subject to the cold computational examination. If any treatment or dosage exceeding a preset limit is detected in the specification, the bill examination server 20 will adjust the billed amount or include a message in the specification so that the examiner can consider the message during examination. The bill examination server 20 may also indicate the adjustment in the statement of examination adjustment.

The computational examination on the medication use evaluation item is performed in view of the "ingredients prohibited to be taken together or at certain ages" which were defined to prevent any improper use of medications and thereby protect our health. If an improper medication prescription is detected in a specification, the bill examination server 20 will adjust the billed amount or include a message in the specification so that the examiner can consider the message during examination. The bill examination server 20 may also indicate the adjustment in the statement of examination adjustment.

The computational examination on the cough suppressant/expectorant item is performed to detect whether two or more cough suppressants or expectorants were prescribed to treat an upper respiratory disease or whether three or more cough suppressants or expectorants were prescribed to treat a lower respiratory disease. If prescription of cough suppressants or expectorants over a limited number is detected in a specification, the bill examination server 20 will adjust the billed amount or include a message in the specification so that the examiner can consider the message during examination. The bill examination server 20 may also indicate the adjustment in the statement of examination adjustment.

The computational examination on the dental treatment item is performed to sequentially check medical fees, material prices and drug prices in specifications relating to dental caries, dental pulp diseases or periodontal diseases. If any treatment or dosage exceeding a preset limit is detected in a specification, the bill examination server 20 will adjust the billed amount or include a message in the specification so that the examiner can consider the message during examination. The bill examination server 20 may also indicate the adjustment in the statement of examination adjustment.

The computational examination on the childbirth treatment item is performed to sequentially check medical fees, material prices and drug prices in specifications relating to a single natural delivery, single delivery by forceps or vacuum extractor, single delivery by other means, or multiple delivery. If any treatment or dosage exceeding a preset limit is detected in a specification, the bill examination server 20 will adjust the billed amount or include a message in the specification so that the examiner can consider the message during examination. The bill examination server 20 may also indicate the adjustment in the statement of examination adjustment.

As explained above, items subject to the computational examination are previously set. The bill examination server 20 carries out the computational examination on the preset items in the specifications on which specialist inspection has been completed. When a specification including an erroneous or problematic item is detected, the bill examination server 20 adjusts the item and indicates the adjustment in the statement of examination adjustment. If necessary, the bill examination server 20 will include a message regarding the checked items in the state of examination adjustment so that the message can be considered during the examination conducted by the examiner. Also, the bill examination server 20 stores a list of bills and specifications on which computational examination has been completed and which are subject to an on-screen examination, together with the statement of examination adjustment for each specification, in the examination database 22.

In the step (S70) of distributing the bills and specifications, the management terminal 30 receives a list of bills and specifications subject to an on-screen examination and distributes the bills and specifications to the examiner terminals 40. Prior to the distribution, the management terminal 30 checks the bills and specifications on which computational examination has been completed. At this time, the management terminal 30 checks automatic inspection codes "A," "F," "K," "L" and "U" and items checked during the processes from the automatic inspection to the computational examination.

Figure 3:
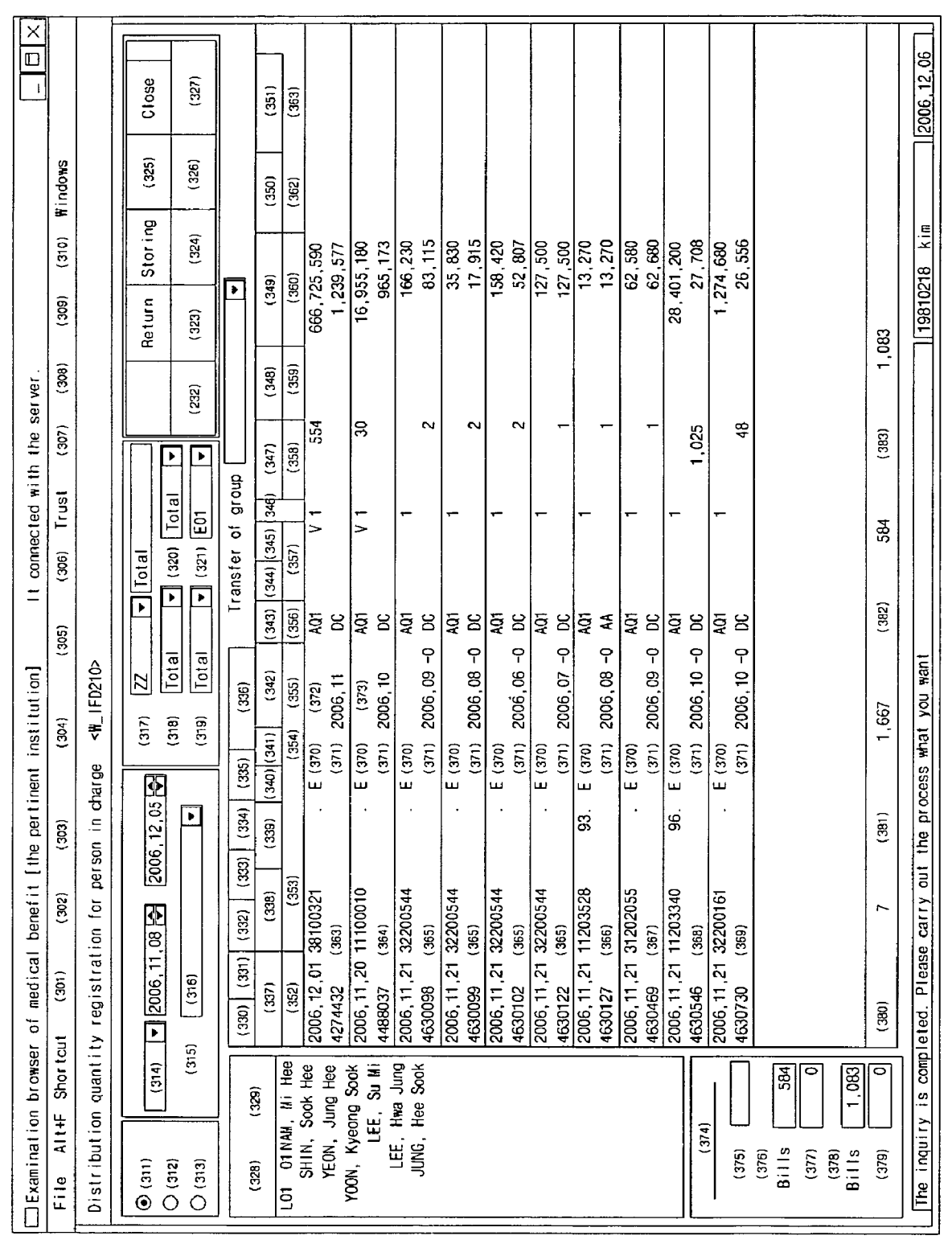

The management terminal 30 displays the list of bills and specifications received from the bill examination server 20, and conducts new distribution or redistribution of the bills and specifications. Before conducting the new distribution which distributes bills and specifications examined for the first time, the management terminal 30 reviews the bills in the order of receipt dates and selects examiners and receipt numbers. The new bills and specifications are distributed to the examiner terminals 40 by an automatic distribution or division distribution method. The automatic distribution is used only for the new distribution. The automatic distribution is a way to select examiners according to medical institutions or under specific conditions and distribute the new bills and specifications to the selected examiners. In other words, the automatic distribution method distributes all specifications attached to one or more bills to the selected examiners. In the division distribution, however, multiple specifications attached to a single bill are distributed to one examiner. If multiple specifications naming the same medical care receiver are attached to a single bill, the management terminal 30 will distribute those specifications to the same examiner through automatic distribution and division distribution. The management terminal 30 displays distribution quantity registration data or division distribution registration data for the new distribution. FIG. 3 shows distribution quantity registration data displayed on a management terminal. FIG. 4 shows division distribution registration data displayed on a management terminal. The distribution quantity registration data displayed on the management terminal 30 includes bill search conditions (such as the period of receipt dates, department of examiner and indicated treatment area), examiner's name, and data described in a bill (such as the receipt number, receipt date, medical institution, number of hospitalization cases, number of outpatient cases and medical care benefits). The division distribution registration data includes basic bill data (such as the receipt number, receipt date, medical institution, number of specifications attached, number of medical care receivers), a list of object specifications, names of examiners and current distribution status. The list of specifications includes information, such as specification serial numbers, medical care receivers, resident registration numbers of the medical care receivers, total amount of medical care benefits, and treatment areas. The management terminal 30 distributes the specifications according to the number of the specifications inputted after the selection of examiners. If multiple specifications naming the same medical care receiver are included in the list of specifications, those multiple specifications will be selected simultaneously and distributed.

Figure 5:
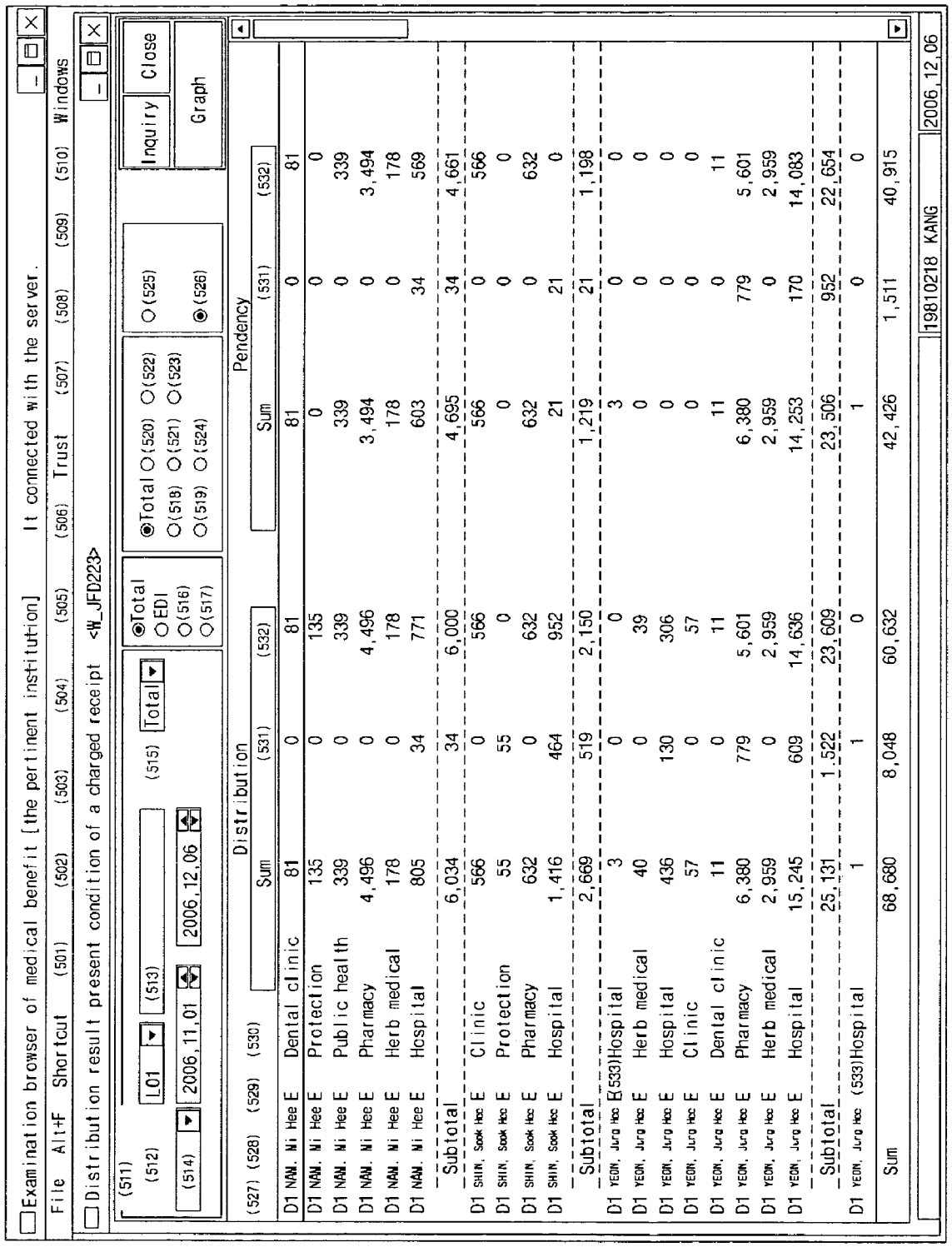
FIG. 5 shows specification distribution status data displayed on an examiner terminal.

When requested, the examiner terminals 40 receive and display the distribution status. FIG. 5 shows specification distribution status data displayed on an examiner terminal. The specification distribution status data includes status of specifications distributed to the examiners according to the search conditions (such as period of receipt dates, distribution date and department of each examiner) and status of examination progress. The management terminal 30 sends a distribution list including the list of bills and specifications distributed to the examiners to the bill examination server 20.

In the step (S80) of sending on-screen examination results, each examiner terminal 40 receives the distributed bills and specifications, allows an examiner to input results of examination, and sends the inputted examination results to the bill examination server 20. This step (S80) may include selecting a bill, selecting a specification, conducting an examination on the selected bill and specification, and sending results of the examination. Upon completion of the examination, each examiner terminal 40 sends examination completion information to the management terminal 40. At the same time, each examiner terminal 40 sends a statement of examination adjustment to the bill examination server 20.

Figure 6:
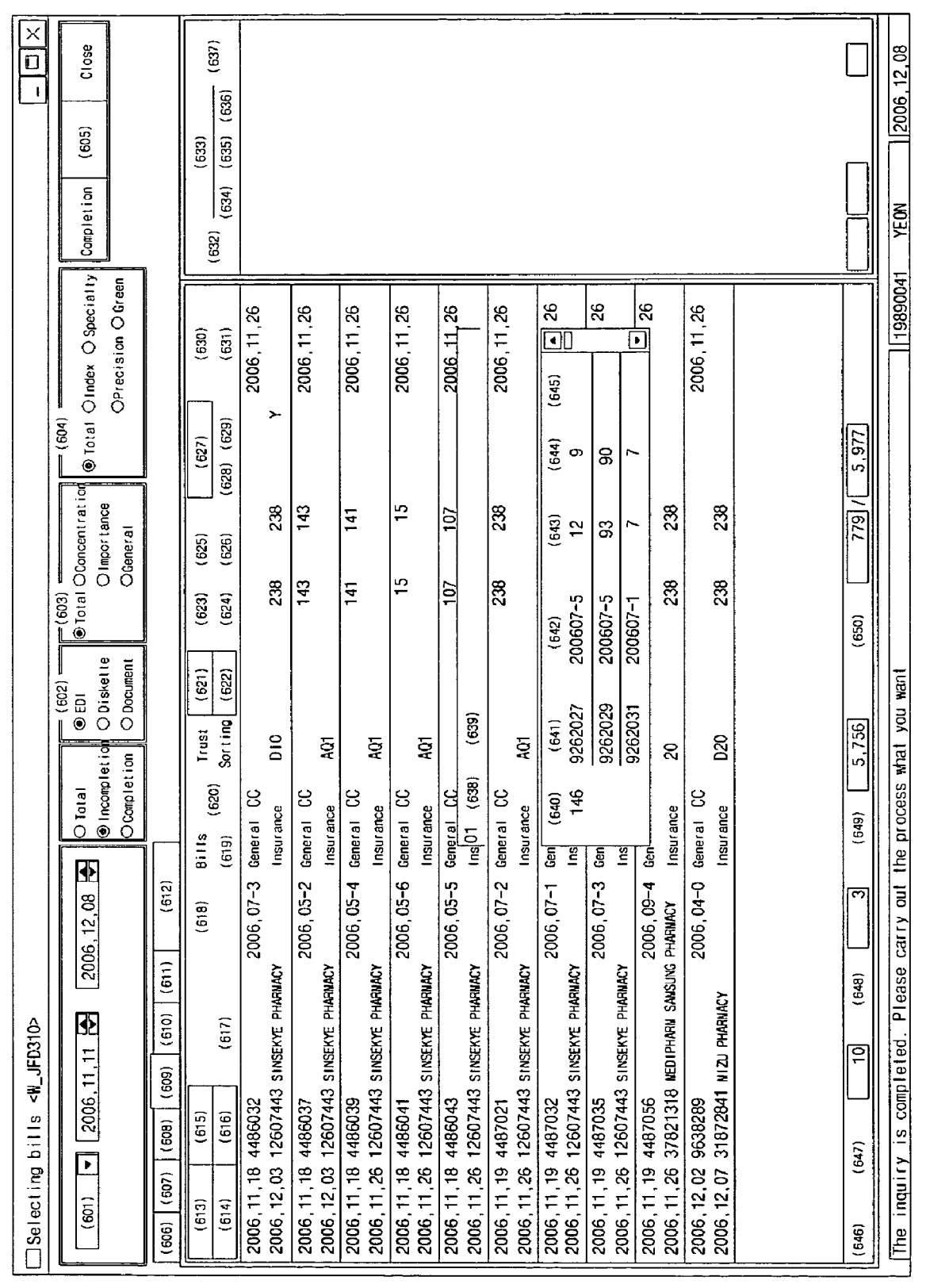

Each examiner terminal 40 displays a list of the distributed bills and allows the examiner in charge to select a bill to be examined. FIG. 6 shows a display screen of an examiner terminal 40 which displays a bill selection mode. According to the search conditions inputted by the examiner, such as period of receipt dates, distribution date, incompletion or completion, medium classification, general management and examination method, the examiner terminal 40 displays a list of corresponding bills. In the bill selection mode, items on each bill, such as the receipt date, distribution date, receipt number, medical institution, medical code and name, and year/date of medical treatment, are displayed. Also, in the bill selection mode, a pop-up window is generated to display information on medical care receivers, year/date of treatment corresponding to a specific receipt number, number of cases, number of medical care receivers. Accordingly, each examiner terminal 40 displays a list of specifications attached to a bill selected by the examiner.

Figure 7:
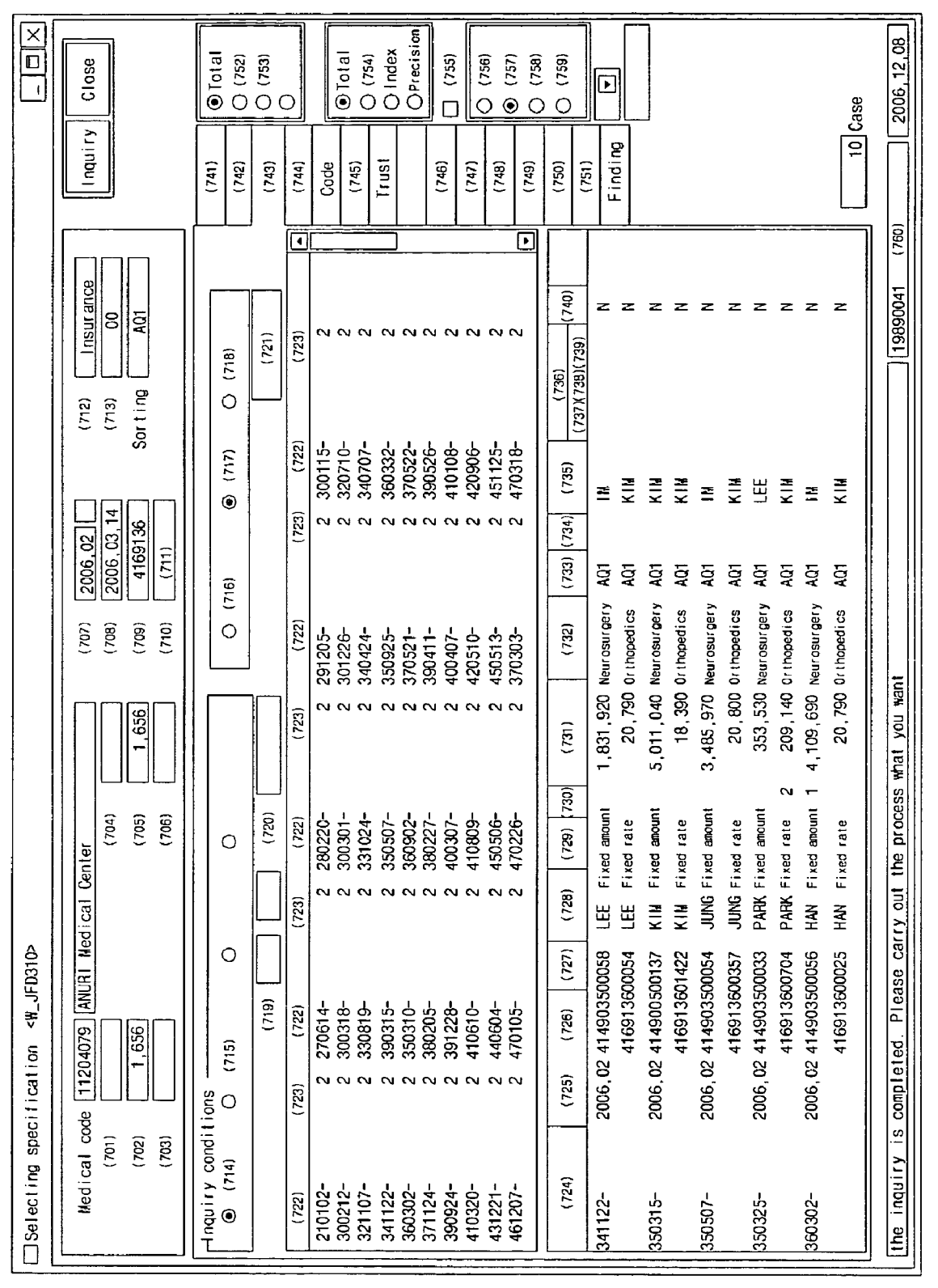
Figure 9:
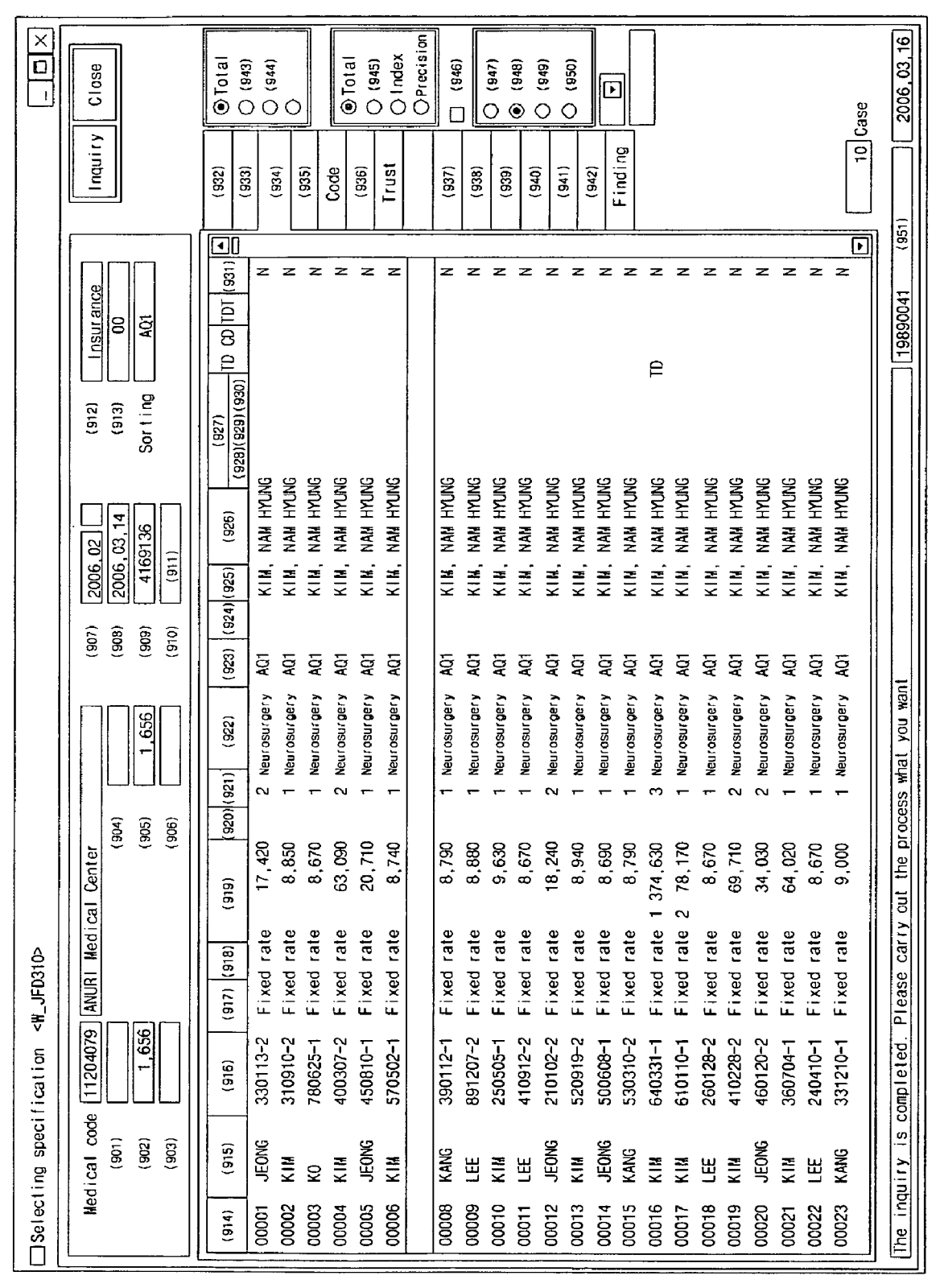

Also, the examiner terminal 40 displays a list of specifications attached to each distributed bill in a specification selection mode. FIG. 7 shows a display screen of an examiner terminal which displays a specification selection mode for selecting specifications according to the search condition (same medical care receiver). FIG. 8 shows a display screen of an examiner terminal which displays a specification selection mode for selecting specifications corresponding to a specific item. FIG. 9 shows a display screen of an examiner terminal which displays a specification selection mode for selecting a specification corresponding to a specification serial number. In the specification selection mode, basic items on each bill, specification search conditions and a list of specifications are displayed. Each examiner terminal 40 displays a list of specifications selected according to the search conditions inputted by the examiner in the specification selection mode. The search conditions include a specification serial number, automatic inspection, same medical care receiver, same disease, code and treatment area. Additional sub-conditions can be included in each search condition. For example, the search condition "same medical care receiver" may include additional conditions, such as exclusion of the same medical care receiver, receipt number, current month, inclusion of the last month, and medical care receiver's name and resident registration number. When the search condition is "same medical care receiver," items such as resident registration number, year/date of medical treatment, receipt number, specification serial number, name of the medical care receiver, and total amount of medical care benefits are displayed in the specification selection mode. Since the examiner conducts an examination on specifications selected as having similar or identical contents, the examination efficiency can be improved.

Each examiner terminal 40 displays medical treatment data included in a selected specification in order to be examined by the examiner. The examiner will examine reasonableness of the amount of medical care benefits and estimation of the medical care benefits based on the examination criteria under the national health insurance act. The examiner may conduct an index examination to check only basic items in the bills and specifications sent from a medical institution. Also, the examiner may entrust an examination commissioner with specialized examination after checking specifications on which computational examination has been completed.

Figure 10:
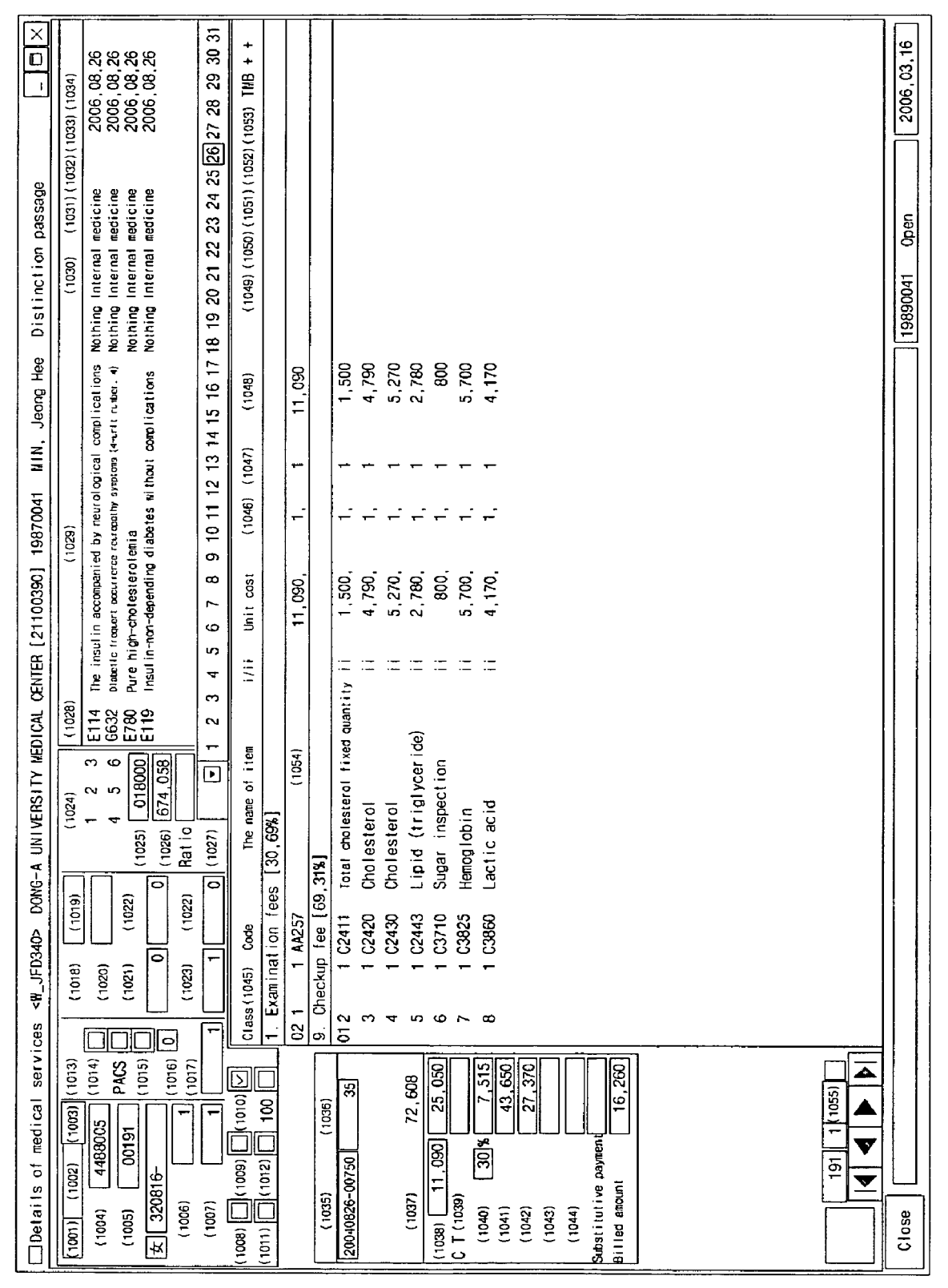
Figure 11:
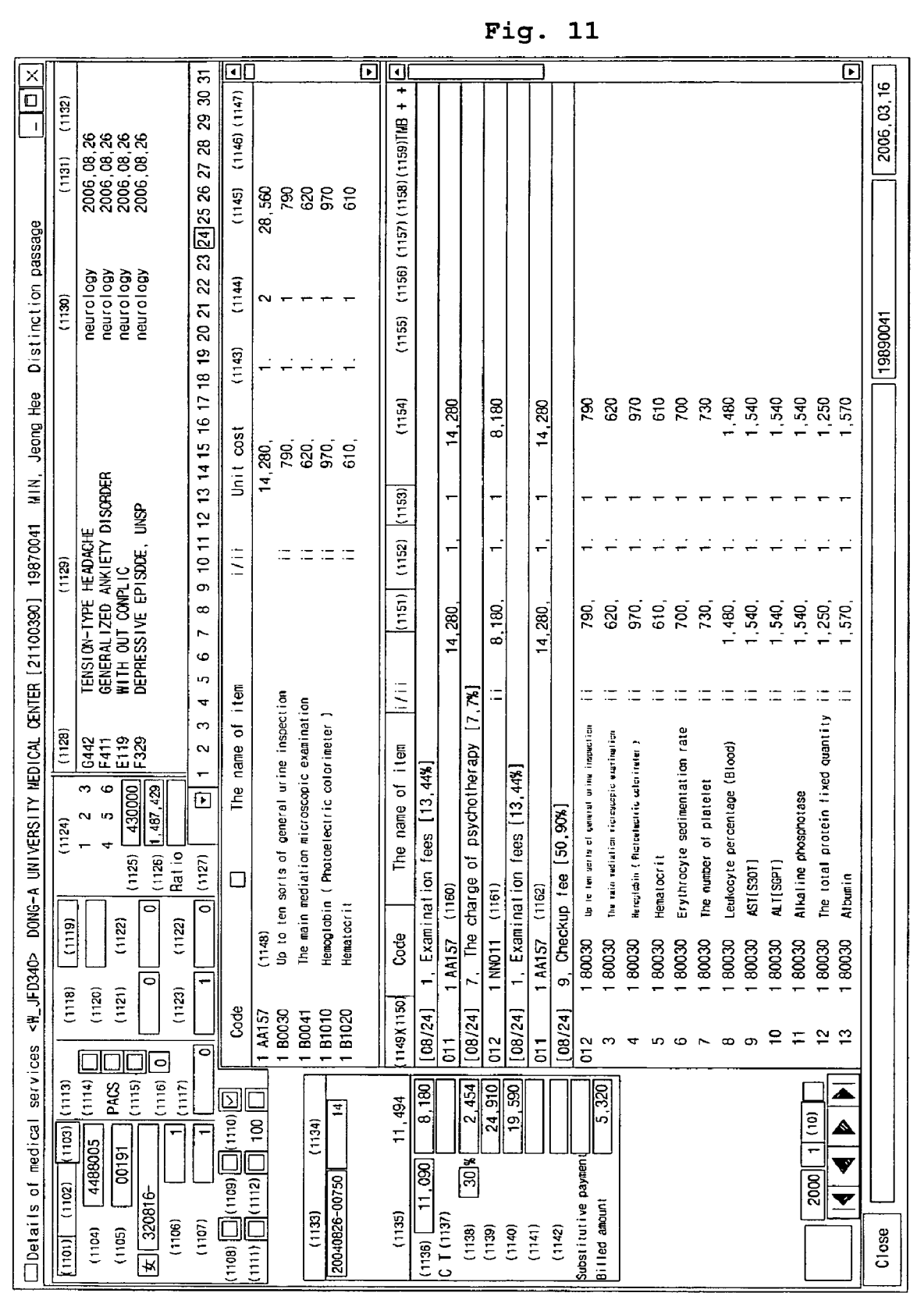
Figure 12:
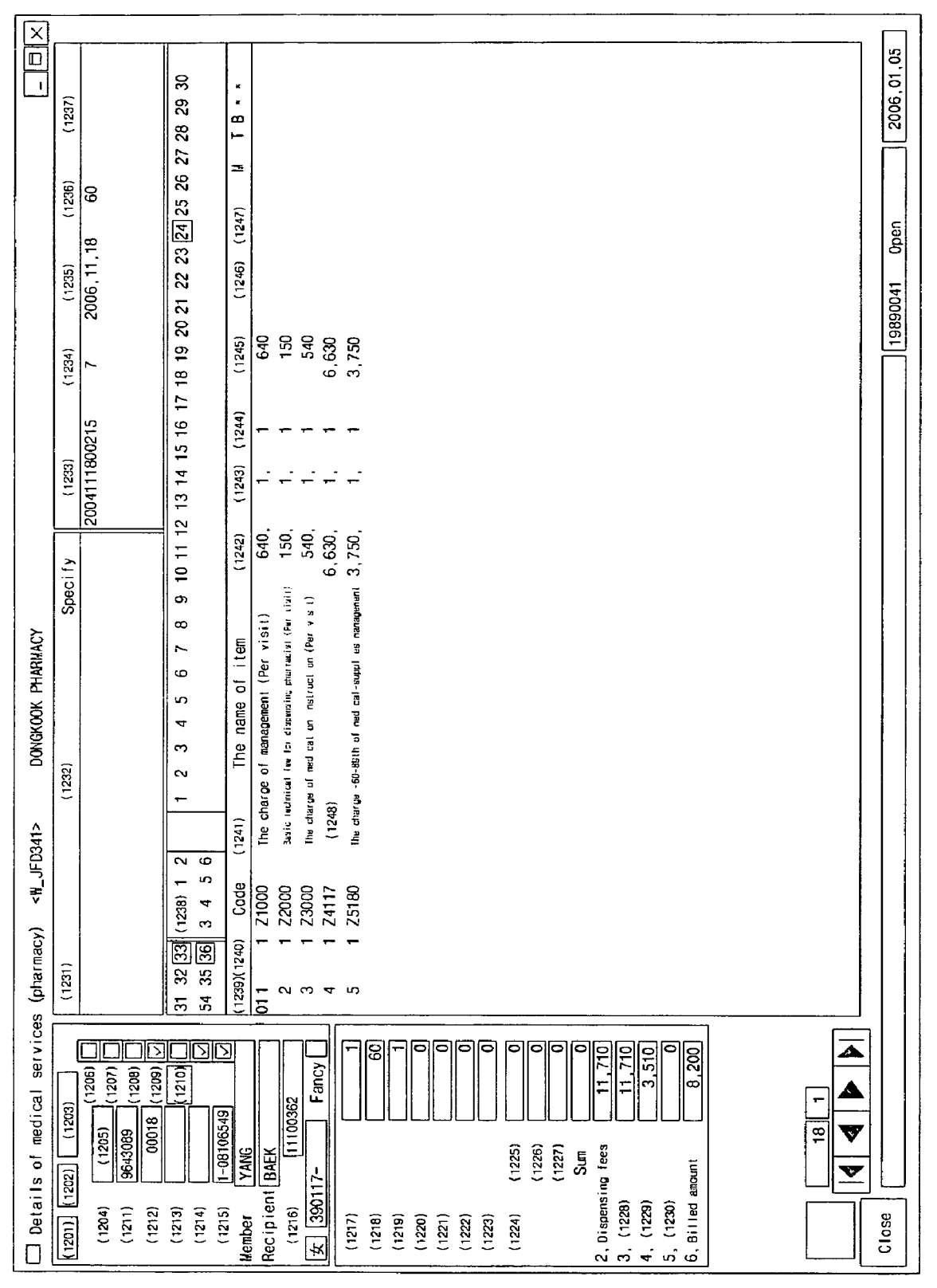

FIG. 10 shows a display screen of an examiner terminal which displays medical treatment data included in a specification of medical fees billed on a monthly basis. FIG. 11 shows a display screen of an examiner terminal which displays medical treatment data included in a specification of medical fees billed on a daily basis. FIG. 12 shows a display screen of an examiner terminal which displays medical treatment data included in a specification sent from a pharmacy. The displayed specification and medical treatment data show information, such as the receipt number of a bill to which the specification is attached, specification serial number, patient's personal data and treatment days, name of disease, start date of medical care, medical treatments performed, fees for each treatment, and medical fee calculation. The examiner reviews the medical treatment data in the specification displayed on the examiner terminal 40 and conducts an examination on the specification. Medical treatments can be classified according to the kinds of medical institutions, i.e. medical/dental treatment, herbal treatment, pharmacy treatment and public health center treatment. The examiner adjusts the amounts of billed items (unit price, daily dosage, total dosage, billed amount, code, etc.) in each specification, and inputs any adjustment in the examiner terminal 40 to indicate the adjusted item. Regarding a treatment of the same code, the examiner can make a line number adjustment or a total amount adjustment. In case of a line number adjustment, the examiner terminal 40 indicates the adjustment detail in the corresponding line number. Also, the examiner terminal 40 may indicate any adjustment inputted during examination by at least one method of: singular adjustment for adjusting a code, unit price, daily dosage or total dosage; aggregate queue adjustment for adjusting the whole amounts of line numbers which are identical in unadjusted code, unit price, daily dosage and total dosage; plural adjustment for simultaneously adjusting items of multiple line numbers for the same reason or type of adjustment; compulsive adjustment for inputting an adjusted amount when an item is not expressed by (unit price×daily dosage×total dosage); and associated adjustment for adjusting items of two or more line number in association with each another and inputting an adjusted amount in a first associated adjustment line. The examiner terminal 40 indicates the items adjusted by the above adjustment in a statement of examination adjustment. Also, in case of a total amount adjustment, the examiner terminal 40 may make the total amount adjustment and partial specification adjustment in each specification. The total amount adjustment is done on items, such as incorrect calculation, insufficiency to receive benefits, non-benefit items, 100/100 user charge items in medical benefits, double billing, and medical benefits applied for after expiration of the prescription period. The examiner terminal 40 may add the adjustment inputted by the examiner during examination to the statement of examination adjustment. In addition, the examiner terminal 40 may request that the examination commissioner terminal 50 conduct an on-screen examination according to the examiner's input during the examination.

FIG. 13 shows an aggregate queue adjustment performed on an examiner terminal. The examiner can input a code corresponding to the reason for adjustment in the examiner terminal 40. In order to entrust an examination commissioner with examination, the examiner should input a corresponding examination commissioner code. The code (reason for adjustment) inputted during the aggregate queue adjustment can be the same as that used during the medical treatment data adjustment. Also, upon a request inputted by the examiner, the examiner terminal 40 searches for a master file corresponding to the treatment code and displays the detected master file. FIG. 14 shows a master file search window generated on a display screen of an examination terminal. The examiner terminal 40 sends the inputted code of treatment to the bill examination server 20. The bill examination server 20 then sends information on a master file corresponding to the code to the examiner terminal 40.

A specification may include an item named "specific." When the examiner selects the "specific" item, the examiner terminal 40 displays the details of the specific item which were inputted by a pertinent medical institution. The specific item provides information added to the description of specific treatment (dispensing) or billing, such as injury causes, specific codes, or codes of exceptions to the separation of dispensing and prescription. The injury causes are classification codes assigned to various causes of diseases according to the "Korean Standard Classification of Disease Causes." In the specific item, only an English initial (for example, V, W, X or Y) is used to indicate an injury cause. The specific codes are assigned to patients suffering from chronic renal failure, cancer or hemophilia, patients who need stem cell transplantation, and patients who have undergone transplantation (liver, heart or pancreas). The codes of exceptions to the separation of dispensing and prescription are used in case of dispensing or medication in a medical institution (which can be either a medical clinic or a health care center) in the event of exceptions for the separation. The specific item describes a corresponding code.

Figure 15:
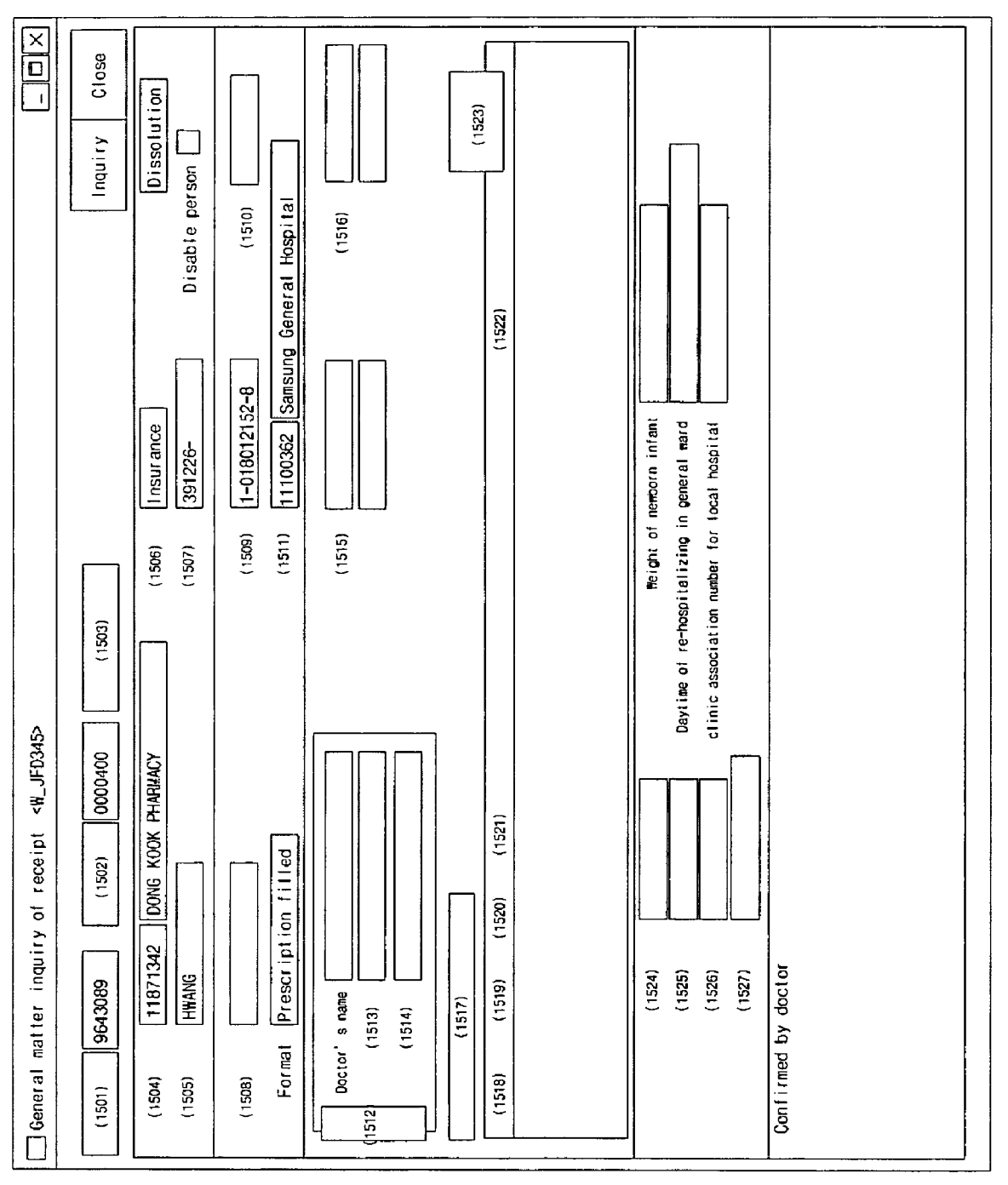

FIG. 15 shows general specification items displayed on an examiner terminal. FIG. 16 shows original billing data displayed on an examiner terminal. The displayed picture for checking general specification items in FIG. 15 includes a button for selecting original billing data. When the button is selected, the examiner terminal 40 displays original billing data so that the examiner can review the data during examination.

A specification may include an item named "100." When the examiner selects the "100" item, the examiner terminal 40 displays 100/100 user-charge treatment data which includes 100/100 treatment (dispensing) or prescription data. FIG. 17 shows 100/100 user-charge treatment data displayed on an examiner terminal. The display of 100/100 user-charge treatment data includes a button for selecting original billing data at a top portion thereof. When the button is selected, the examiner terminal 40 displays original billing data as illustrated in FIG. 16 so that the examiner can review the data during examination.

Also, when a line number of a particular code is selected in a specification, the examiner terminal 40 displays data corresponding to the line number. FIG. 18 shows data displayed upon a line number selection on an examiner terminal. The data can be displayed in a pop-up manner. The display of the data corresponding to a selected line number includes a button for selecting original billing data as illustrated in FIG. 16 so that the examiner can review the data during examination.

In addition, the examiner terminal 40 enables the examiner to register or review the records of examination by medical institutions (details and indexes of examination), to prepare or review any request for examination and results (any request for entrusting an examination commissioner with examination and a corresponding examination decision), to decide a failure to examine (unexaminable specifications) or withhold examination, to modify general items (number of consultations, consulting fees, injury causes or the like), to output a specification, to register examination reference data submitted by a medical institution, and to register or review fees for testing sensitivity to an anti-tuberculosis agent.

Figure 19:
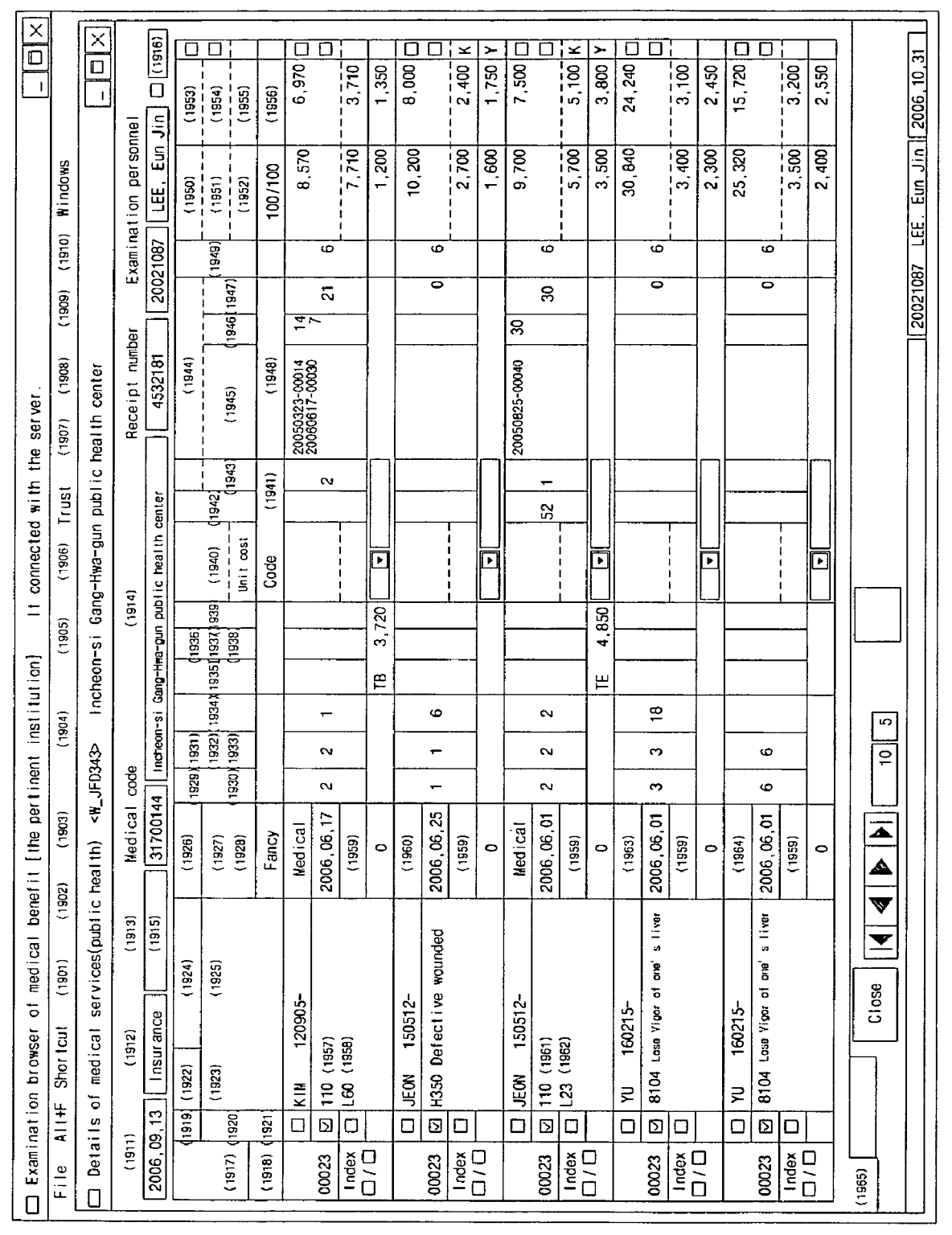
Figure 20:
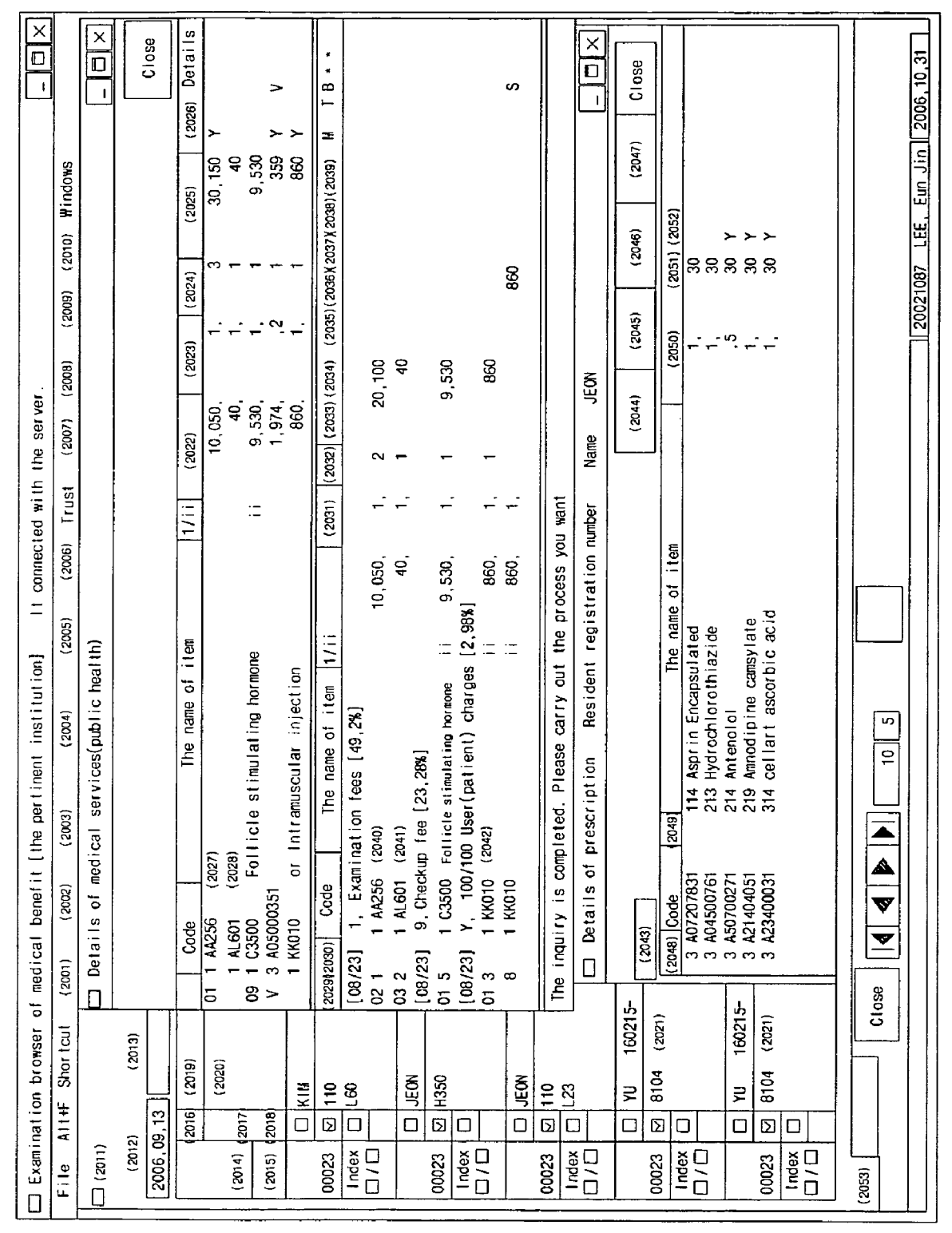

The examiner terminal 40 can also display a medical treatment specification of a selected public health center. FIG. 19 shows a medical treatment specification of a public health center which is displayed on an examiner terminal for on-screen examination. The displayed specification includes basic information on the health center, receipt number, examiner's name, 100/100 button of each specification serial number, medical care receiver data and disease, and treatment cost. The examiner terminal 40 displays detailed medical treatment data of a selected specification serial number. FIG. 20 shows medical treatment data displayed on an examiner terminal upon selection of a specification of a public health center. The picture displaying medical treatment data shows codes, details of medical services, admitted amounts of medical fees according to the examination results, and any adjustment after automatic inspection and specialist inspection at an upper portion thereof. The picture displaying medical treatment data shows an admitted amount of medical fees for each medical service at a lower portion thereof. The picture displaying medical treatment data for an on-screen examination of medical care benefits may also display prescription data added to the specification which was selected by clicking a corresponding specification serial number. The prescription data shows codes, names of drugs, daily dosage and total dosage of each drug. The examiner terminal 40 reflects modifications made by the examiner to correct the medical treatment data displayed for the on-screen examination. The examiner can adjust the data included in a specification using an adjustment method, such as singular adjustment, aggregate queue adjustment, plural adjustment, compulsive adjustment and associated adjustment. The examiner terminal 40 includes adjusted matters and any notices in a statement of examination adjustment and send the statement to the bill examination server 20. The bill examination server 200 stores the statement of examination adjustment in the examination database 22. For a bill of which examination has been completed, the examiner terminal 40 informs the management terminal 30 of the completion of examination. Then the management terminal 30 closes examination of the bill and terminates the examination procedure.

In the step (S85) of sending results of an on-screen examination conducted by an examination commissioner, the examination commissioner terminal 50 sends results of examination conducted by the examination commissioner on the bills and specifications entrusted by the examiner terminal 40. If a specialized medical judgment is needed to determine appropriateness of a medical treatment, the examiner terminal 40 may send bills and specifications to the examination commissioner and entrust the commissioner with examination of the bills and specifications. Like the examiner terminal 40, the examination commissioner terminal 50 displays the received bills and specifications so that the examination commissioner can conduct an on-screen examination. Upon completion of examination, the examination commissioner terminal 50 sends information on the examination completion to the management terminal 30 and also delivers a statement of examination adjustment to the bill examination server 20.

In the step (S90) of generating and sending an examination decision file, the bill examination server 20 generates an examination decision file based on the statement of examination adjustment received from the examiner terminal 40 and the adjusted bills and specifications, and sends the generated examination decision file to the national health insurance corporation server 300. More specifically, the examination decision file is generated based on the statement of examination adjustment received from the examiner terminal 40 and the adjusted bills and specifications, stored in the examination database 22, and sent to the national health insurance corporation server 300. Also, the bill examination server 20 sends the examination decision file to the corresponding medical institution server 200 through the transmit/receive server 10.

In the step (S100) of receiving eligibility appraisal results for medical care receivers, the bill examination server 20 receives the results of appraisal on each medical care receiver's eligibility, which are included in the examination decision file, from the national health insurance corporation server 300. Also, the bill examination server 30 updates information stored in the examination reference database according to the eligibility appraisal results which show a medical care receiver's eligibility to receive health insurance benefits. If a specification naming the same medical care receiver is received at a later time, the bill examination server 20 can check the eligibility item in the specification by reference to the updated eligibility information.

In the electronic examination of medical fees according to the present invention, items that can be formalized are previously set to be checked in the bill examination server before examination by the examiner, which reduces the examiner's workload and improves the efficiency of examination.

Also, the bill examination server returns any erroneous bills or specifications detected during its inspection process to a pertinent medical institution or requests a correction to an erroneous item, thereby improving the efficiency of examination.

Although a preferred embodiment of the present invention has been described for illustrative purposes, those skilled in the art will appreciate that various modifications, additions and substitutions are possible, without departing from the scope and spirit of the invention as disclosed in the accompanying claims.

BRIEF EXPLANATION OF THE DRAWINGS

FIG. 1
Transmit/receive server 10
Primitive DB 12
Bill examination server 20
Management terminal 30
Examiner terminal 40
Examination commissioner terminal 50
Medical institution server 200
Relay DB 255
Communication relay center 250
Portal receipt DB 24
Examination DB 22
Examination reference DB 26
Homepage 28
National health insurance corporation server 300
FIG. 2
Start
Receiving bills and specifications (S10)
Registering the receipt of bills and specifications (S20)
Inspecting descriptions in the bills and specifications (S30)
Any error in a bill?
Returning the bill and specifications attached thereto (S35)
Performing automatic inspection on the specifications (S40)
Any error in a specification?
Sending the erroneous specification to the portal receipt server (S42)
Performing automatic inspection on the corrected specification (S44)
Performing specialist inspection on the specifications (S50)
Performing computational examination on the specifications (S60)
Distributing the bills and specifications (S70)
Sending results of on-screen examination (S80)
Sending result of on-screen examination conducted by an examination commissioner (S85)
Generating and send an examination decision file (S90)
Receiving eligibility appraisal results (S100)
FIG. 3
301: Managerial state
302: Examination processing
303: General management
304: Information for medical care
305: Computational examination
306: Examination reference
307: Distribution
308: Statistics
309: The pertinent examination institution
310: Searching the public hatred
311: New distribution
312: Redistribution
313: Exception for distribution
314: Receipt date
315: Department in charge/group
316: Examination 1 section 1 group
317: Subject indication
318: General management
319: Examination method
320: Sorting
321: Medium
322: Automatic action to head office
323: Result of distribution
324: No distribution
325: Cancellation
326: Legal communicable disease
327: Examination CI/Method
328: Examination Department/Group
329: Person in charge
330: Hospital
331: Clinic
332: Dental clinic
333: Pharmacy
334: Herb medical
335: Public health 336: Psychiatric amount
337: Receipt date
338: Medical code
339: General index
340: Medium
341: Bills
342: Clinic filed
343: Sorting
344: Management
345: Large amount
346: The number of volumes
347: The number of hospitalization cases
348: Kind of disease index
349: The total amount of medical care benefits
350: Distribution hospitalization
351: Person in charge
352: Receipt number
353: The name of medical institution
354: Doubling insurance
355: Medical care year/month
356: Examination
357: Management
358: The number of ambulatory care cases
359: Exception for distribution
360: Medical care benefits per case
361: Distribution ambulatory care
362: Distribution date
363: HYEMYEONGSIM MEDICAL FOUNDATION CENTER
364: NATIONAL MEDICAL CENTER
365: GANGNAM MEDICAL FOUNDATION
366: CHUNG HWA MEDICAL CENTER
367: EONSU MEDICAL CENTER
368: GANG-SEO SERAN MEDICAL CENTER
369: MEDICAL MANAGEMENT PLACE FOR INDUSTRIAL DISASTER JUNGSUN MEDICAL CENTER
370: General
371: Insurance
372: Internal medicine
373: Obstetrics/Pediatrics
374: Quantity of distribution per person
375: The number of person in charge
376: Hospitalization (direct compounding)
377: Quantity of distributions
378: Ambulatory care (prescription filled)
379: Quantity of distribution
380: The number of institutions
381: The number of selected cases
382: Hospitalization
383: Ambulatory care
384: The inquiry is completed. Please carry out the process what you want
FIG. 4
401: Receipt number
402: Receipt date
403: Medical code
404: The total number of cases
405: The number of medical care receiver
406: The number of volumes
407: The number of distribution cases
408: Examination CI/method
409: Consultation storing
410: Cancellation
411: Examination Department/Group
412: Person in charge
413: NAM, Mi Hee
414: Person in charge
415: The number of distributions
416: Distribution date
417: A series name
418: Medical Care Receiver
419: Resident registration number
420: The total amount of medical care benefits
421: subject of the medical examination/specialties
422: Sorting
423: Code
424: Existing person in charge
425: Reservation of Advisory
426: Disease
427: Name
428: subject of the medical examination/specialties
429: The total number of cases
430: Designation
431: Relegation
432: The others
433: Precision
434: Index
435: Separation
436: Internal medicine
437: Pediatrics
438: Internal medicine
439: The number of cases
440: The number of medical care receiver
FIG. 5
501: Managerial state
502: Examination processing
503: General management
504: Information for medical care
505: Computational examination
506: Examination standards
507: Distribution
508: Statistics
509: The pertinent examination institution
510: Searching the public hatred
511: Inquiry conditions
512: Examination department
513: Examination department 1
514: Receipt date
515: Examination group
516: Diskette
517: Document
518: Dental clinic
519: Public health
520: Hospital
521: Pharmacy
522: Clinic
523: Herb medical
524: Psychiatric amount
525: Classified by specification
526: Institution classification
527: Party
528: Person in charge
529: Medium
530: Classification
531: Hospitalization (direct compounding)
532: Ambulatory care (prescription filled)
533: Document
FIG. 6
601: Receipt date
602: Medium classification
603: General management
604: Examination method
605: Cancellation
606: Hospital 607: Clinic
608: Dental clinic
609: Pharmacy
610: Public health
611: Herb medical
612: Psychiatric amount
613: Receipt date
614: Distribution date
615: Receipt number
616: Medical code
617: The name of medical institution
618: Medical care year/month
619: Person who insured
620: Examination synthesis
621: Management
622: Management CI
623: Receipted direct compounding
624: Receipted direct compounding
625: Distribution direct compounding
626: Distribution prescription filled
627: Completion date
628: Reference
629: Duplication large sum
630: Taking-over the examination
631: Termination/Return
632: A series name
633: Examination request yes or no
634: yes or no
635: Processing
636: Completion
637: Incapability examination
638: Grade index
639: confirmation of medical care days of relative bill is required.
640: Medical Care Receiver
641: Receipt number
642: Medical care year/month
643: The number of cases
644: the number of medical care receiver
645: The final day
FIG. 7
701: The number of receipted hospitalization cases
702: The number of receipted ambulatory care cases
703: The number of receipted daytime ward cases
704: The number of distribution hospitalization cases
705: The number of distribution ambulatory care cases
706: The number of distribution daytime ward cases
707: Medical care year/month
708: Receipt date
709: Receipt number
710: Bill classification
711: General requested bill
712: Person who insured classification
713: Medical-examination field
714: The same medical care receiver
715: Exception of the same medical care receiver
716: Inside of a receipt number
717: A part for this month
718: The inclusion of the previous month
719: Residents fiscal year
720: name of medical care receiver
721: Inquiry of specification
722: Resident registration number
723: The number of cases
724: Resident registration number
725: Medical care year/month
726: Receipt number
727: A series name
728: Medical Care Receiver
729: The rate of a fixed amount
730: First medical examination
731: The total amount of medical care benefits
732: subject of the medical examination/specialties
733: Sorting
734: Incapability
735: Examination personnel
736: Request for examination
737: Request
738: Processing
739: Completion
740: Inspection
741: A series name
742: Automatic inspection
743: The same medical care receiver
744: The same sickness and wound
745: Medical-examination item (Medical-examination)
746: Trust
747: subject of the medical examination/specialties
748: The number of medicine item
749: The specific items
750: Large amount etc.
751: Items correction
752: Proof matter
753: Hospitalization
754: Ambulatory care
755: computation by computer
756: Medical Care Receiver
757: Daily allowance expense
758: The total amount of benefits
759: The number of medical-treatment days
760: Visit-to-the-hospital days
761: Verification personnel
FIG. 8
801: The number of receipted hospitalization cases
802: the number of receipted ambulatory care cases
803: The number of receipted daytime ward cases
804: The number of distribution hospitalization cases
805: The number of distribution ambulatory care cases
806: The number of distribution daytime ward cases
807: Medical care year/month
808: Receipt date
809: Receipt number
810: Bill classification
811: General requested bill
812: Person who insured classification
813: Clinic field
814: Inquiry of specification
815: The number of specifications
816: the number of medical care receiver
817: A series name
818: Automatic inspection
819: The same medical care receiver
820: The same sickness and wound
821: Medical-examination item (Medical-examination)
822: subject of the medical examination/specialties
823: The number of medicine item
824: The specific items
825: Large amount etc.
826: Items correction
827: Proof matter
828: Hospitalization
829: Ambulatory care
830: computation by computer
831: A series name 832: Medical Care Receiver
833: Resident registration number
834: Amount rate
835: First medical examination
836: Visit to the hospital
837: The total amount of medical care benefits
838: subject of the medical examination/specialties
839: Sorting
840: Incapability
841: Examination personnel
842: Examination request
834: Request
844: Processing
845: Completion
846: Inspection
847: Verification personnel
FIG. 9
901: The number of receipted hospitalization cases
902: the number of receipted ambulatory care cases
903: The number of receipted daytime ward cases
904: The number of distribution hospitalization cases
905: The number of distribution ambulatory care cases
906: The number of distribution daytime ward cases
907: Medical care year/month
908: Receipt date
909: Receipt number
910: Bill classification
911: General requested bill
912: Person who insured classification
913: Medical-examination field
914: A series name
915: Medical Care Receiver
916: Resident registration number
917: The rate of a fixed amount
918: First medical examination
919: The total amount of medical care benefits
920: Holiday
921: Visit to the hospital
922: subject of the medical examination/specialties
923: Sorting
924: Distinction
925: Incapability
926: Examination personnel
927: Request for examination
928: Request
929: Processing
930: Completion
931: Inspection
932: A series name
933: Automatic inspection
934: The same medical care receiver
935: The same sickness and wound
936: Medical-examination item (Medical-examination
937: subject of the medical examination/specialties
938: The number of medicine item
939: Specific details
940: Large amount etc.
941: Items correction
942: Proof matter
943: Hospitalization
944: Ambulatory care
945: Computation by computer
946: Medical Care Receiver
947: Daily allowance expense
948: The total amount of benefits
949: The number of medical-treatment days
950: Visit-to-the-hospital days
951: Verification personnel
FIG. 10
1001: Insurance
1002: Ambulatory care
1003: Fixed rate
1004: Receipt number
1005: A series name
1006: Medical care days on current month
1007: Hospitalization/visit-to-the-hospital days
1008: Description
1009: Automation
1010: Specialty
1011: Specify
1012: General
1013: Consultation
1014: Obstacle
1015: Lighting
1016: Fancy
1017: The number of times of prescription
1023: Night/Holiday
1024: Request unit classification
1025: Illness group
1026: Amount of money
1027: Examination CI
1028: Classification codes
1029: Sickness-and-wound name
1030: An operation
1031: Clinic section
1032: Injury
1033: Specify
1034: Medical service start date
1035: Grant number
1036: The days of medical prescription
1037: Non parliamentary—a prescription medicine agent
1038: Subtotal
1039: Total amount
1040: The rate of addition (per day)
1041: The total amount of medical care benefits
1042: User(patient) charges
1043: Burden maximum amount of money about the person himself
1044: Medical expenses of disabled person
1045: Line number
1046: Daily dosage
1047: Total dosage
1048: Admitted amounts
1049: Adjustment amounts
1050: Changing date
1051: Trust
1052: Exception
1053: Confirmation
1054: Re-examination consultation fee—Comprehensive special medical treatment
1055: Reference
FIG. 11
1101: Insurance
1102: Ambulatory care
1103: Fixed rate
1104: Receipt number
1105: A series name
1106: Medical care days on current month
1107: Hospitalization/visit-to-the-hospital days
1108: Description
1109: Automation
1110: Specialty
1111: Specify
1112: General 1113: Consultation
1114: Obstacle
1115: Lighting
1116: Fancy
1117: The number of times of prescription
1118: Result of medical-examination
1119: Continuation
1120: Protection classification
1121: The number of times of the first medical examination
1122: Night/Holiday
1123: The number of times of re-examination
1124: Request unit classification
1125: Illness group
1126: Amount of money
1127: Examination CI
1128: Classification codes
1129: Sickness-and-wound name
1130: Clinic section
1131: Medical care start date
1132: Existence/nothing
1133: Grant number
1134: The days of medical prescription
1135: Non parliamentary—a prescription medicine agent
1136: Subtotal
1137: The total amount
1138: The rate of addition (per day)
1139: The total amount of medical care benefits
1140: User (patient) charges
1141: Burden maximum amount of money about the person himself
1142: Medical expenses of disabled person
1143: Daily dosage
1144: Total dosage
1145: Admitted amounts
1146: Adjustment
1147: Details
1148: First-medical-examination consultation fee—Comprehensive special medical-treatment organization, installed by the comprehensive special medical-treatment organization.
1149: Class
1150: Line number
1151: Unit cost
1152: Daily dosage
1153: Total dosage
1154: Admitted amounts
1155: Adjustment amounts
1156: Changing date
1157: Trust
1158: Exception
1159: Confirmation
1160: First-medical-examination consultation fee—Comprehensive special medical-treatment organization
1161: Individual moral medical treatment—Support treatment
1162: First-medical-examination consultation fee—Comprehensive special medical-treatment organization
FIG. 12
1201: Insurance
1202: Prescription filled
1203: Fixed rate
1204: Bill classification
1205: General requested bill
1206: General
1207: Description
1208: Automation
1209: Specialty
1210: Reference
1211: Receipt number
1212: A series name
1213: Protection classification
1214: Office sign
1215: Proof number
1216: Prescription grant organization
1217: The total visit days
1218: The total medication days
1219: The number of prescriptions
1220: Public holidays
1221: Part medication on the 1st
1222: Part medication on the 2nd
1223: More than the part medication on the 3rd.
1224: Price of medicine
1225: Internal use
1226: External application
1227: Injection
1228: The total amounts of medical care benefits
1229: User (patient) charges
1230: Burden maximum amount of money about the person himself
1231: Classification codes
1232: Sickness and wound (symptom) name
1233: The issued numbering for a medical prescription
1234: Usable years/use-by date
1235: Pharmacy medication days
1236: The number of days for medication
1237: The number of times of repetitive pharmacy
1238: the said month
1239: Class
1240: Line number
1241: Dispensing
1242: Unit cost
1243: Daily dosage
1244: Total dosage
1245: Admitted amounts
1246: Adjustment amounts
1247: Changing date
1248: Prescription pharmacy—An excess of the part on oral medicine the $30^{th}$
FIG. 13
1301: Admitted amounts
1302: Adjustment
1303: Re-examination consultation fee—installed by the comprehensive special medical-treatment organization
1304: Class
1305: Line number
1306: Exception
1307: Confirmation
1308: Re-examination consultation fee—Comprehensive special medical-treatment organization
1309: Reason for adjustment
1310: Examination committee
FIG. 14
1401: Admitted amounts
1402: Adjustment
1403: Class
1404: Line number
1405: Inquiry of master
1406: Inquiry of medical care file
1407: Unit cost
1408: Application day
1409: Classification number
1410: Benefits classification
1411: Calculation name
FIG. 15

1501: Receipt number
1502: A series name
1503: Inquiry for the original bill
1504: Medical code
1505: Medical Care Receiver
1506: Person who insured section
1507: Resident registration number
1508: Admission name (name of householder)
1509: Certification number (admission number)
1510: Business number (secure organization number)
1511: Prescription grant organization
1512: follow doctor
1513: Resident registration number
1514: Number of qualification
1515: The process of hospitalizing
1516: Result of medical-examination
1517: addition/supplementation/separate charged bill Yes/No
1518: Classification
1519: Receipt number
1520: A series name
1521: Reason for failed examination
1522: The first day of hospitalizing
1523: Request a lend
1524: Medication days of the House (Injection agent)
1525: Medication days of the House (Injection agent)
1526: Classify code for separation of dispensary from medical practice
1527: Discrepancy residence number cases
FIG. 16
1601: Receipt number
1602: A series name
1603: Classification
1604: Line number
1605: Medical care
FIG. 17
1701: Medical care (prescription) details
1702: Inquiry for the original bill
1703: Prescription filled details
FIG. 18
1801: Receipt number
1802: A series name
1803: Searching original requests
1804: Line number
1805: confirm the related code
FIG. 19
1901: Managerial state
1902: Examination processing
1903: General management
1904: Information for medical care
1905: Computational examination
1906: Examination standards
1907: Distribution
1908: Statistics
1909: The pertinent examination institution
1910: Searching the public hatred
1911: Receipt date
1912: Person who insured section
1913: Bill classification
1914: The name of medical institution
1915: General requested bill
1916: Specification
1917: A series name
1918: Specify
1919: Reference
1920: Insure
1921: Incapability
1922: Medical Care Receiver
1923: Classification codes
1924: Resident registration number
1925: Sickness-and-wound name
1926: Medical care department
1927: Medical care start date
1928: Form of medical care
1929: The number of visited days
1930: The number of hospitalization days
1931: First medical examination
1932: The medical re-examination
1933: The number of days for medical care
1934: The number of days for medication
1935: The numbers of days of physical therapy
1936: Night
1937: Holiday
1938: Premature birth
1939; Polyembryonic
1940: Material/Anti-toxic
1941: Admitted amounts
1942: Exceptional item
1943: The number of issued medical prescription
1944: Medical prescription which issued outside of hospital
1945: The issued numbering for a medical prescription
1946: The days of medical prescription
1947: total days of medical prescription
1948: Adjustment amounts
1949: Medical care days on current month
1950: The total amount of medical care fees
1951: User (patient) charges
1952: The total amount of medical care fee
1953: Billed amount
1954: Disable person
1955: The total amount of insurance benefit
1956: Non-benefits
1957: Essential (PROTO-manifestation) hypertension
1958: Essential (SINGLE-manifestation) hypertension
1959: Ambulatory care
1960: oriental medical treatment/Prescription
1961: Essential (PROTO-manifestation) hypertension
1962: Allergic contact dermatitis
1963: Oriental medical treatment/Prescription
1964: oriental medical treatment
1965: Public health
FIG. 20
2001: Managerial state
2002: Examination processing
2003: General management
2004: Information for medical care
2005: Computational examination
2006: Examination standards
2007: Distribution
2008: Statistics
2009: The pertinent examination institution
2010: Searching the public hatred
2011: Details of medical services (public health)
2012: Receipt date
2013: Person who insured section
2014: A series name
2015: Specify
2016: Reference
2017: Insure
2018: Incapability
2019: Medical Care Receiver
2020: Classification codes
2021: Lose Vigor of one's liver 2022: Unit cost
2023: Daily dosage
2024: Total dosage
2025: Admitted amounts
2026: Adjustment
2027: Medical fee of re-examination—general hospital, in case of special hospital for medical care
2028: Managing fee of medical item for outpatient—for 1 day (general hospital)
2029: Class
2030: Line number
2031: Unit cost
2032: Daily dosage
2033: Total dosage
2034: Admitted amounts
2035: Adjustment amounts
2036: Changing date
2037: Trust
2038: Exception
2039: Confirmation
2040: Re-examination consultation fee—General hospital
2041: Managing fee of medical item for outpatient—for 1 day (general hospital)
2042: Hypodermic or Intramuscular injection
2043: Summary information
2044: Summary sheet browser
2045: Detail browser
2046: Whole browser
2047: Inquiry of specification
2048: Section
2049: Benefits
2050: Daily dosage
2051: Total dosage
2052: Adjustment
2053: Public health

What is claimed is:

1. A method for electronic examination of medical fees using a medical fee electronic examination system which includes: a transmit/receive server having a primitive database and communicating with each medical institution server through a communication relay center and a network; a bill examination server having an examination database, an examination reference database and a portal receipt database and communicating with each medical institution server, a health insurance corporation server and the transmit/receive server; a management terminal and examiner terminals communicating with the bill examination server, said method comprising the steps of:

a bill and specification receiving step in which the transmit/receive server accesses the communication relay center, receives medical bills and specifications sent from each medical institution server and stores the received medical bills and specifications in the primitive database;

a bill and specification receipt registering step in which the bill examination server receives the bills and specifications from the transmit/receive server, assigns a receipt number to each bill, registers the receipt and stores the received bills and specifications in the examination database;

a description inspection step in which the bill examination server inspects descriptions in the received bills and specifications, including basic information on each medical institution and bill classification, and sends a notice of return to a corresponding medical institution server if any errors or omissions are detected in descriptions of a bill or a specification;

an automatic inspection step in which the bill examination server performs an automatic inspection on the specifications on which description inspection has been completed in order to detect any error in items billed, including a reference price applied, fees calculated and benefits applied for, and corrects the detected error or inserts a message into a corresponding specification;

an erroneous specification sending step in which the bill examination server sends a specification having an error in automatic inspection items which are assigned automatic inspection codes to the portal receipt database;

a corrected specification receiving step in which the bill examination server receives a specification with the error corrected by the medical institution server and performs an automatic inspection on the corrected specification;

a specialist inspection step in which the bill examination server checks the specifications on which automatic inspection has been completed or corrected specifications to determine whether items, such as medical fees, drug prices, drug dispensing fees and injection fees, are correct, and corrects any incorrect item or inserts a message into a corresponding specification;

a computational examination step in which the bill examination server performs a computational examination on the specifications on which specialist inspection has been completed in order to detect any treatment or dosage exceeding a preset limit in items including cold and medication use evaluation, and adjusts a billed amount or inserts a message into a corresponding specification if an excessive treatment or dosage is detected;

a bill and specification distribution step in which the management terminal receives a list of bills and specifications, on which computational examination has been completed and which are subject to on-screen examination, from the bill examination server and distributes the bills and specifications to the examiner terminals;

an on-screen examination result sending step in which each examiner terminal receives the distributed bills and specifications from the bill examination server, allows an examiner to input examination results for the bills and specifications, and sends the inputted examination results to the bill examination server; and an examination decision file generating and sending step in which the bill examination server generates an examination decision file based on the examination results received from each examiner terminal and adjusted bills and specifications, and sends the examination decision file to the medical institution server and the national health insurance corporation server, wherein the cold evaluation in said computational examination step is performed to check a specification relating to acute respiratory infection and adjust a billed amount or indicate the adjustment in a statement of examination adjustment if any treatment or dosage exceeding a preset limit is detected in the specification, and wherein the medication use evaluation in said computational examination step is performed to detect any improper prescription of medications which are prohibited to be taken together or at certain ages, and indicate the improper prescription in the statement of examination adjustment.

2. The method of claim 1, wherein said description inspection step includes detecting whether over a predetermined rate of specifications attached to a bill are erroneous, and sending a notice of return to return the bill and all the specifications attached thereto.

3. The method of claim 1, wherein said automatic inspection items assigned automatic inspection codes include at least one of an error in estimation of a unit price, an error in a fee code, an error in application of a reference medical fee, an error in calculation of a billed amount, an item of non-benefits or user charge in whole, a failure to submit a reference document, an error in code classification, an error or omission in the inspection authority number or request date of inspection if inspection was entrusted to an inspection authority, and arbitrary direct dispensing.

4. The method of claim 1, wherein said automatic inspection step is carried out by the bill examination server based on a master file including information necessary for the examination of automatic inspection items and stored in the examination reference database.

5. The method of claim 1, wherein said bill and specification distribution step performed by management terminal displays a list of bills to be distributed according to predetermined conditions, such as dates of receipt and medical institutions, and distributes the bills and specifications attached thereto to selected examiner terminals using an automatic distribution or division distribution method.

6. The method of claim 1, wherein said on-screen examination result sending step further including an on-screen examination result of an examination commissioner sending step in which each examiner terminal sends the bills and specifications distributed to an examination commissioner terminal to entrust the examination of the bills and specifications and the examination commissioner terminal sends examination results inputted to the bill examination server.

7. The method of claim 1, further comprising after the examination decision file generating and sending step: an eligibility appraisal result receiving step in which the bill examination server receives results of appraisal of medical care receivers' eligibility from the national health insurance corporation server and updates information stored in the examination reference database according to the eligibility appraisal results.

8. The method of claim 1, wherein said on-screen examination result sending step performed by the examiner terminal indicates any adjustment inputted by at least one method of singular adjustment, aggregate queue adjustment, plural adjustment, compulsive adjustment and associated adjustment in the statement of examination adjustment.

9. The method of claim 1, wherein said on-screen examination result sending step performed by the examiner terminal displays medical service inquiry data, displays 100/100 medical service inquiry data when a 100/100 user charge item is clicked, and displays details of a particular item when the particular item is clicked.

10. The method of claim 1, wherein said on-screen examination result sending step performed by the examiner terminal indicates an adjustment made on at least one item of a calculation error, insufficiency to receive benefits, a non-benefit item and a 100/100 user charge item, in the statement of examination adjustment.

\* \* \* \* \*